US006560578B2

(12) United States Patent
Eldering

(10) Patent No.: US 6,560,578 B2
(45) Date of Patent: May 6, 2003

(54) ADVERTISEMENT SELECTION SYSTEM SUPPORTING DISCRETIONARY TARGET MARKET CHARACTERISTICS

(75) Inventor: Charles A. Eldering, Doylestown, PA (US)

(73) Assignee: Expanse Networks, Inc., Doylestown, PA (US)

( * ) Notice: Subject to any disclaimer, the term of this patent is extended or adjusted under 35 U.S.C. 154(b) by 95 days.

(21) Appl. No.: 09/774,473

(22) Filed: Jan. 31, 2001

(65) Prior Publication Data

US 2001/0004733 A1 Jun. 21, 2001

Related U.S. Application Data

(63) Continuation of application No. 09/268,526, filed on Mar. 12, 1999, now Pat. No. 6,216,129.

(51) Int. Cl.[7] .............................................. G06F 17/60
(52) U.S. Cl. ........................................................ 705/14
(58) Field of Search ................................ 705/1, 10, 14, 705/26; 707/10, 104.1

(56) References Cited

U.S. PATENT DOCUMENTS

| | | | |
|---|---|---|---|
| 4,833,308 A | 5/1989 | Humble | 235/383 |
| 4,930,011 A | 5/1990 | Kiewit | 358/84 |
| 4,972,504 A | 11/1990 | Daniel, Jr. et al. | 455/2 |
| 5,099,319 A | 3/1992 | Esch et al. | 358/86 |
| 5,128,752 A * | 7/1992 | Von Kohorn | 358/84 |
| 5,155,591 A | 10/1992 | Wachob | 358/86 |
| 5,201,010 A | 4/1993 | Deaton et al. | 382/7 |
| 5,227,508 A | 7/1993 | Kozikowski et al. | 382/7 |
| 5,231,494 A | 7/1993 | Wachob | 358/146 |
| 5,237,620 A | 8/1993 | Deaton et al. | 382/7 |

(List continued on next page.)

FOREIGN PATENT DOCUMENTS

| | | |
|---|---|---|
| WO | 9423383 | 10/1994 |
| WO | 9717774 | 5/1997 |
| WO | 9726612 | 7/1997 |
| WO | 9741673 | 11/1997 |
| WO | 9821877 | 5/1998 |
| WO | 9828906 | 7/1998 |
| WO | 9834189 | 8/1998 |
| WO | 9901984 | 1/1999 |
| WO | 9904561 | 1/1999 |
| WO | 9965237 | 12/1999 |
| WO | 9966719 | 12/1999 |
| WO | 0008802 | 2/2000 |
| WO | 0014951 | 3/2000 |
| WO | 0033224 | 6/2000 |
| WO | 0054504 | 9/2000 |

OTHER PUBLICATIONS

Fortanet et al., Netvertising: content–based subgeneric variations in a digital genre, IEEE, System Sciences Proceddings of the Thirty–First Hawaii International Conference, vol. 2, pp. 87–96, Jan. 1998.*
2001/0004733 Eldering Jun. 21, 2001.*

Primary Examiner—Stephen Gravini
(74) Attorney, Agent, or Firm—Douglas J. Ryder

(57) ABSTRACT

An advertisement selection system is presented in which vectors describing an actual or hypothetical market for a product or desired viewing audience can be determined. An ad characterization vector is transmitted along with a consumer ID. The consumer ID is used to retrieve a consumer characterization vector which is correlated with the ad characterization vector to determine the suitability of the advertisement to the consumer. The consumer characterization vector describes statistical information regarding the demographics and product purchase preferences of a consumer, and is developed from previous purchases or viewing habits. A price for displaying the advertisement can be determined based on the results of the correlation of the ad characterization vector with the consumer characterization vector.

72 Claims, 17 Drawing Sheets

U.S. PATENT DOCUMENTS

| | | | |
|---|---|---|---|
| 5,305,196 A | 4/1994 | Deaton et al. | 364/401 |
| 5,315,093 A | 5/1994 | Stewart | 235/381 |
| 5,331,544 A | 7/1994 | Deaton et al. | 364/401 |
| 5,388,165 A | 2/1995 | Deaton et al. | 382/7 |
| 5,430,644 A | 7/1995 | Deaton et al. | 364/401 |
| 5,446,919 A | 8/1995 | Wilkins | 455/6.2 |
| 5,448,471 A | 9/1995 | Deaton et al. | 364/401 |
| 5,559,549 A | 9/1996 | Hendricks et al. | 348/6 |
| 5,592,560 A | 1/1997 | Deaton et al. | 382/100 |
| 5,604,542 A | 2/1997 | Dedrick | 348/552 |
| 5,621,812 A | 4/1997 | Deaton et al. | 382/100 |
| 5,638,457 A | 6/1997 | Deaton et al. | 382/100 |
| 5,642,485 A | 6/1997 | Deaton et al. | 395/214 |
| 5,644,723 A | 7/1997 | Deaton et al. | 395/214 |
| 5,649,114 A | 7/1997 | Deaton et al. | 395/214 |
| 5,659,469 A | 8/1997 | Deaton et al. | 395/214 |
| 5,661,516 A | 8/1997 | Carles | 348/8 |
| 5,675,662 A | 10/1997 | Deaton et al. | 382/137 |
| 5,687,322 A | 11/1997 | Deaton et al. | 395/214 |
| 5,724,521 A | 3/1998 | Dedrick | 395/226 |
| 5,761,662 A | 6/1998 | Dasan | 707/10 |
| 5,774,170 A | 6/1998 | Hite et al. | 348/9 |
| 5,774,868 A | 6/1998 | Cragun et al. | 705/10 |
| 5,832,457 A | 11/1998 | O'Brien et al. | 705/14 |
| 5,848,396 A * | 12/1998 | Gerace | 705/10 |
| 5,918,014 A | 6/1999 | Robinson | 395/200.49 |
| 5,933,811 A | 8/1999 | Angles et al. | 705/14 |
| 5,948,061 A | 9/1999 | Merriman et al. | 709/219 |
| 5,970,469 A | 10/1999 | Scroggie et al. | 705/14 |
| 5,974,396 A | 10/1999 | Anderson et al. | 705/10 |
| 5,974,399 A | 10/1999 | Giuliani et al. | 705/14 |
| 5,977,964 A | 11/1999 | Williams et al. | 345/327 |
| 5,978,799 A * | 11/1999 | Hirsch | 707/4 |
| 5,991,735 A | 11/1999 | Gerace | 705/10 |
| 6,005,597 A | 12/1999 | Barrett et al. | 348/1 |
| 6,009,010 A | 12/1999 | LeMole et al. | 705/14 |
| 6,009,409 A | 12/1999 | Adler et al. | 705/14 |
| 6,014,634 A | 1/2000 | Scroggie et al. | 705/14 |
| 6,020,883 A | 2/2000 | Herz et al. | 345/327 |
| 6,026,370 A | 2/2000 | Jermyn | 705/14 |
| 6,055,573 A | 4/2000 | Gardenswartz et al. | 709/224 |
| 6,084,628 A | 7/2000 | Sawyer | 348/14 |
| 6,088,722 A | 7/2000 | Herz et al. | 709/217 |
| 6,108,637 A | 8/2000 | Blumenau | 705/7 |
| 6,119,098 A | 9/2000 | Guyot et al. | 705/14 |
| 6,134,532 A | 10/2000 | Lazarus et al. | 705/14 |
| 6,160,989 A | 12/2000 | Hendricks et al. | 455/4.2 |
| 6,177,931 B1 | 1/2001 | Alexander et al. | 345/327 |
| 6,185,541 B1 | 2/2001 | Scroggie et al. | 705/14 |
| 6,298,348 B1 * | 10/2001 | Eldering | 707/10 |

* cited by examiner

```
READ POP DATA
FOR N=1 TO M
    READ PRODUCT ID
    RETRIEVE [PRODUCT DEMOGRAPHICS VECTOR]
    RETRIEVE [DEMOGRAPHIC CHARACTERIZATION VECTOR]
    RETRIEVE [PRODUCT PREFERENCE VECTOR]
    WEIGHT = PRODUCT TOTAL PURCHASE/PRODUCT CATEGORY
            TOTAL PURCHASE
    HOUSEHOLD DEMOGRAPHICS VECTOR =
            (WEIGHT)*(PRODUCT DEMOGRAPHICS VECTOR)+
            (DEMOGRAPHIC CHARACTERIZATION VECTOR)
    NORMALIZE [DEMOGRAPHIC CHARACTERIZATION VECTOR]
    STORE [DEMOGRAPHIC CHARACTERIZATION VECTOR]
    PRODUCT PREFERENCE VECTOR =
            (WEIGHT * PRODUCT PURCHASE VECTOR)+(PRODUCT
            PREFERENCE VECTOR)
    NORMALIZE [PRODUCT PREFERENCE VECTOR]
    STORE [PRODUCT PREFERENCE VECTOR]
NEXT M
```

*FIG. 6A*

```
READ [AD DEMOGRAPHIC VECTOR]
READ [AD PRODUCT CATEGORY, AD PRODUCT PREFERENCE VECTOR]
RETRIEVE [DEMOGRAPHIC CHARACTERIZATION VECTOR]
RETRIEVE [PRODUCT PREFERENCE VECTOR (PRODUCT CATEGORY)]
DEMOGRAPHIC CORRELATION = CORRELATE [DEMOGRAPHIC
    CHARACTERIZATION VECTOR, AD DEMOGRAPHIC VECTOR]
PRODUCT PREFERENCE CORRELATION = CORRELATE [AD PRODUCT
    PREFERENCE VECTOR, PRODUCT PREFERENCE VECTOR]
RETURN [DEMOGRAPHIC CORRELATION]
RETURN [PRODUCT PREFERENCE CORRELATION]
```

*FIG. 6B*

PRODUCT DEMOGRAPHICS VECTOR

PRODUCT ID

| | | |
|---|---|---|
| HOUSEHOLD INCOME | ≤20K | 0.2 |
| HOUSEHOLD INCOME | 20-40K | 0.3 |
| ... | | |
| HOUSEHOLD SIZE | 0-2 | 0.1 |
| HOUSEHOLD SIZE | 2-4 | 0.3 |

PRODUCT CHARACTERISTICS

PRODUCT ID: 2597251
BRAND: KELLOGG'S CORN FLAKES
SIZE: 32 OZ
PRICE: $2.69

PRODUCT DEMOGRAPHICS RULES

| MONTHLY QUANTITY OF DIAPERS PURCHASED | ESTIMATED HOUSEHOLD SIZE | ESTIMATED # OF CHILDREN <5 |
|---|---|---|
| >300 | >5 | ≥3 |
| 150-300 | 3-5 | 2-3 |
| 50-150 | 3-4 | 1-2 |
| 1-50 | 3-4 | 1 |

HEURISTIC RULES

FIG. 7

ADVERTISEMENT SELECTION SYSTEM SUPPORTING DISCRETIONARY TARGET MARKET CHARACTERISTICS

This application is a continuation of U.S. patent application Ser. No. 09/268,526 filed on Mar. 12, 1999, issued as U.S. Pat. No. 6,216,129 on Apr. 10, 2001.

BACKGROUND OF THE INVENTION

The advent of the Internet has resulted in the ability to communicate data across the globe instantaneously, and will allow for numerous new applications which enhance consumer's lives. One of the enhancements which can occur is the ability for the consumer to receive advertising which is relevant to their lifestyle, rather than a stream of ads determined by the program they are watching. Such "targeted ads" can potentially reduce the amount of unwanted information which consumers receive in the mail, during television programs, and when using the Internet.

From an advertiser's perspective the ability to target ads can be beneficial since they have some confidence that their ad will at least be determined relevant by the consumer, and therefore will not be found annoying because it is not applicable to their lifestyle.

In order to determine the applicability of an advertisement to a consumer, it is necessary to know something about their lifestyle, and in particular to understand their demographics (age, household size, income). In some instances it is useful to know their particular purchasing habits. As an example, a vendor of soups would like to know which consumers are buying their competitor's soup, so that they can target ads at those consumers in an effort to convince them to switch brands. That vendor will probably not want to target loyal customers, although for a new product introduction the strategy may be to convince loyal customers to try the new product. In both cases it is extremely useful for the vendor to be able to determine what brand of product the consumer presently purchases.

There are several difficulties associated with the collection, processing, and storage of consumer data. First, collecting consumer data and determining the demographic parameters of the consumer can be difficult. Surveys can be performed, and in some instances the consumer will willingly give access to normally private data including family size, age of family members, and household income. In such circumstances there generally needs to be an agreement with the consumer regarding how the data will be used. If the consumer does not provide this data directly, the information must be "mined" from various pieces of information which are gathered about the consumer, typically from specific purchases.

Once data is collected, usually from one source, some type of processing can be performed to determine a particular aspect of the consumer's life. As an example, processing can be performed on credit data to determine which consumers are a good credit risk and have recently applied for credit. The resulting list of consumers can be solicited, typically by direct mail.

Although information such as credit history is stored on multiple databases, storage of other information such as the specifics of grocery purchases is not typically performed. Even if each individual's detailed list of grocery purchases was recorded, the information would be of little use since it would amount to nothing more than unprocessed shopping lists.

Privacy concerns are also an important factor in using consumer purchase information. Consumers will generally find it desirable that advertisements and other information is matched with their interests, but will not allow indiscriminate access to their demographic profile and purchase records.

The Internet has spawned the concept of "negatively priced information" in which consumers can be paid to receive advertising. Paying consumers to watch advertisements can be accomplished interactively over the Internet, with the consumer acknowledging that they will watch an advertisement for a particular price. Previously proposed schemes such as that described in U.S. Pat. No. 5,794,210, entitled "Attention Brokerage," of which A. Nathaniel Goldhaber and Gary Fitts are the inventors, describe such a system, in which the consumer is presented with a list of advertisements and their corresponding payments. The consumer chooses from the list and is compensated for viewing the advertisement. The system requires real-time interactivity in that the viewer must select the advertisement from the list of choices presented.

The ability to place ads to consumers and compensate them for viewing the advertisements opens many possibilities for new models of advertising. However, it is important to understand the demographics and product preferences of the consumer in order to be able to determine if an advertisement is appropriate.

Although it is possible to collect statistical information regarding consumers of particular products and compare those profiles against individual demographic data points of consumers, such a methodology only allows for selection of potential consumers based on the demographics of existing customers of the same or similar products. U.S. Pat. No. 5,515,098, entitled "System and method for selectively distributing commercial messages over a communications network," of which John B. Carles is the inventor, describes a method in which target household data of actual customers of a product are compared against subscriber household data to determine the applicability of a commercial to a household. It will frequently be desirable to target an advertisement to a market having discretionary characteristics and to obtain a measure of the correlation of these discretionary features with probabilistic or deterministic data of the consumer/subscriber, rather than being forced to rely on the characteristics of existing consumers of a product. Such correlations should be possible based both on demographic characteristics and product preferences.

Another previously proposed system, described in U.S. Pat. No. 5,724,521, entitled "Method and apparatus for providing electronic advertisements to end users in a consumer best-fit pricing manner," of which R. Dedrick is the inventor, utilizes a consumer scale as the mechanism to determine to which group and advertisement is intended. Such a system requires specification of numerous parameters and weighting factors, and requires access to specific and non-statistical personal profile information.

For the foregoing reasons, there is a need for an advertisement selection system which can match an advertisement with discretionary target market characteristics, and which can do so in a manner which protects the privacy of the consumer data and characterizations.

SUMMARY OF THE INVENTION

The present invention describes a system for determining the applicability of an advertisement to a consumer, based on the reception of an ad characterization vector and use of a unique consumer ID. The consumer ID is used to retrieve a consumer characterization vector, and the correlation between the consumer characterization vector and the ad characterization vector is used to determine the applicability of the advertisement to the consumer. The price to be paid for presentation of the advertisement can be determined based on the degree of correlation.

The price to present an advertisement can increase with correlation, as may be typical when the content/opportunity provider is also the profiling entity. The price can decrease with correlation when the consumer is the profiler, and is interested in, and willing to charge less for seeing advertisements which are highly correlated with their demographics, lifestyle, and product preferences.

The present invention can be used to specify purchasers of a specific product. In a preferred embodiment the advertisement characterization vector contains a description of a target market including an indicator of a target product, i.e., purchasers of a particular product type, brand, or product size. The advertisement characterization vector is correlated with a consumer characterization vector which is retrieved based on a unique consumer ID. The correlation factor is determined and indicates if the consumer is a purchaser of the product the advertisement is intended for. This feature can be used to identify purchasers of a particular brand and can be used to target ads at those consumers to lure them away from their present product provider. Similarly, this feature can be used to target ads to loyal consumers to introduce them to a new product in a product family, or different size of product.

One advantage of the present invention is that discretionary target market parameters can be specified and do not necessarily need to correspond to an existing market, but can reflect the various market segments for which the advertisement is targeted. The market segments can be designated by demographic characteristics or by product preferences.

Another advantage of the present invention is that demographic samples of present purchasers of a product are not required to define the target market.

The present invention can be used to determine the applicability of an advertisement to a consumer based on demographics, product preferences, or a combination of both.

In a preferred embodiment of the present invention the correlation is calculated as the scalar product of the ad characterization vector and the consumer characterization vector. The ad characterization vector and consumer characterization vector can be composed of demographic characteristics, product purchase characteristics, or a combination of both.

In a preferred embodiment pricing for the displaying of said advertisement is developed based on the result of the correlation between the ad characterization vector and the consumer characterization vector. In a first embodiment the pricing increases as a function of the correlation. This embodiment can represent the situation in which the party which determines the correlation also controls the ability to display the advertisement.

In an alternate embodiment the price for displaying the advertisement decreases as a function of the degree of correlation. This embodiment can represent the situation in which the consumer controls access to the consumer characterization vector, and charges less to view advertisements which are highly correlated with their interests and demographics. A feature of this embodiment is the ability of the consumer to decrease the number of unwanted advertisements by charging a higher price to view advertisements which are likely to be of less interest.

One advantage of the present invention is that it allows advertisements to be directed to new markets by setting specific parameters in the ad characterization vector, and does not require specific statistical knowledge regarding existing customers of similar products. Another advantage is that the system allows ads to be directed at consumers of a competing brand, or specific targeting at loyal customers. This feature can be useful for the introduction of a new product to an existing customer base.

Another advantage of the present invention is that the correlation can be performed by calculating a simple scalar (dot) product of the ad characterization and consumer characterization vectors. A weighted sum or other statistical analysis is not required to determine the applicability of the advertisement.

The present invention can be realized as a data processing system and as a computer program. The invention can be realized on an individual computer or can be realized using distributed computers with portions of the system operating on various computers.

An advantage of the present invention is the ability to direct advertisements to consumers which will find the advertisements of interest. This eliminates unwanted advertisements. Another advantage is the ability of advertisers to target specific groups of potential customers.

These and other features and objects of the invention will be more fully understood from the following detailed description of the preferred embodiments which should be read in light of the accompanying drawings.

BRIEF DESCRIPTION OF THE DRAWINGS

The accompanying drawings, which are incorporated in and form a part of the specification, illustrate the embodiments of the present invention and, together with the description serve to explain the principles of the invention.

In the drawings:

FIGS. 6A and 6B illustrate pseudocode updating the characteristics vectors and for a correlation operation respectively;

FIG. 7 illustrates heuristic rules;

DETAILED DESCRIPTION OF THE PREFERRED EMBODIMENT

Figure 1A:
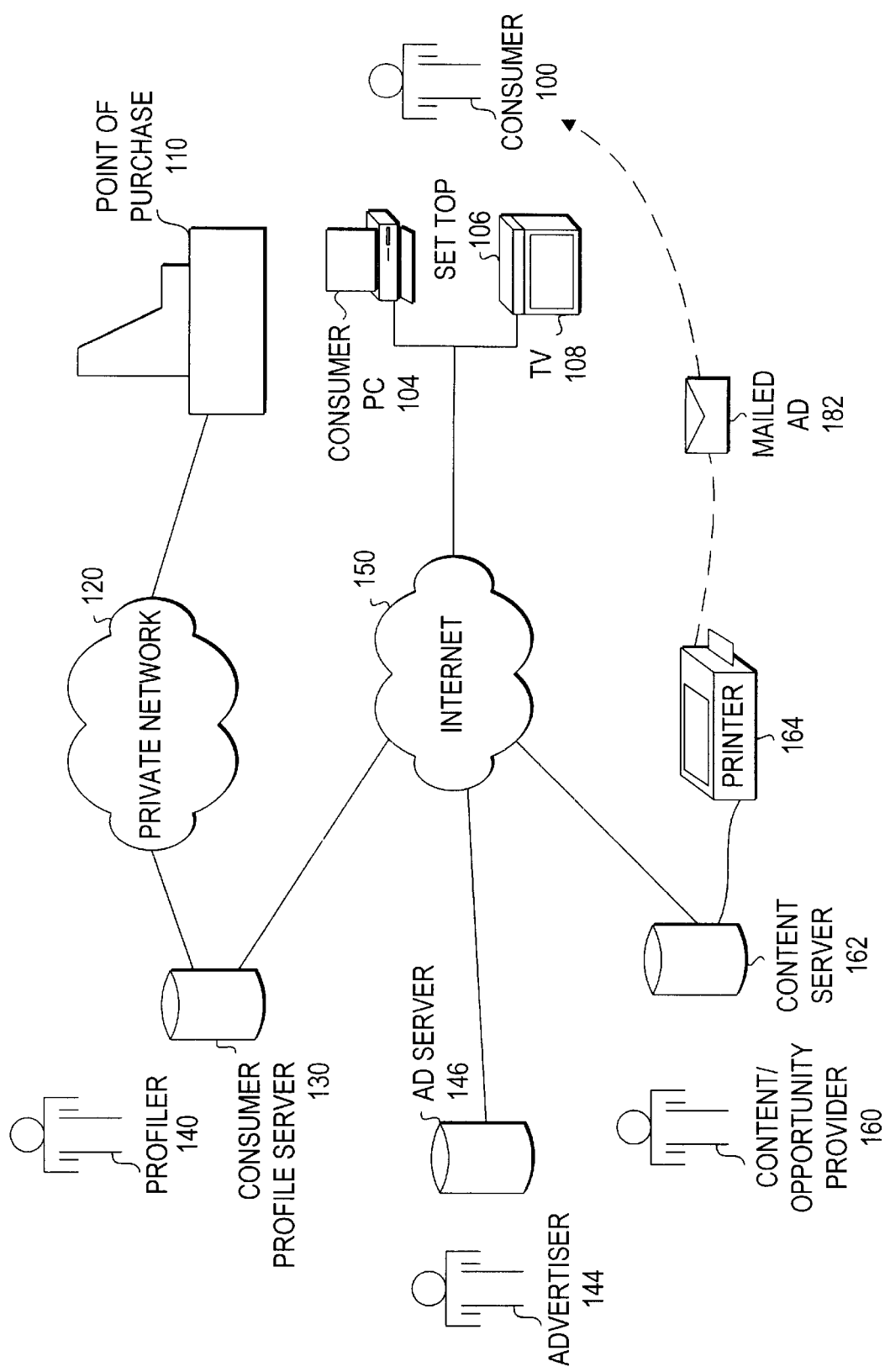
FIGS. 1A and 1B show user relationship diagrams for the present invention.

In describing a preferred embodiment of the invention illustrated in the drawings, specific terminology will be used for the sake of clarity. However, the invention is not intended to be limited to the specific terms so selected, and it is to be understood that each specific term includes all technical equivalents which operate in a similar manner to accomplish a similar purpose.

With reference to the drawings, in general, and FIGS. 1 through 10 in particular, the method and apparatus of the present invention is disclosed.

FIG. 1A shows a user relationship diagram which illustrates the relationships between a consumer profiling system and various entities. As can be seen in FIG. 1, a consumer 100 can receive information and advertisements from a consumer personal computer (PC) 104, displayed on a television 108 which is connected to a set top 106, or can receive a mailed ad 182.

Advertisements and information displayed on consumer PC 104 or television 108 can be received over an Internet 150, or can be received over the combination of the Internet 150 with another telecommunications access system. The telecommunications access system can include but is not limited to cable TV delivery systems, switched digital video access systems operating over telephone wires, microwave telecommunications systems, or any other medium which provides connectivity between the consumer 100 and a content server 162 and ad server 146.

A content/opportunity provider 160 maintains the content server 162 which can transmit content including broadcast programming across a network such as the Internet 150. Other methods of data transport can be used including private data networks and can connect the content sever 160 through an access system to a device owned by consumer 100.

Content/opportunity provider 160 is termed such since if consumer 100 is receiving a transmission from content server 162, the content/opportunity provider can insert an advertisement. For video programming, content/opportunity provider is typically the cable network operator or the source of entertainment material, and the opportunity is the ability to transmit an advertisement during a commercial break.

The majority of content that is being transmitted today is done so in broadcast form, such as broadcast television programming (broadcast over the air and via cable TV networks), broadcast radio, and newspapers. Although the interconnectivity provided by the Internet will allow consumer specific programming to be transmitted, there will still be a large amount of broadcast material which can be sponsored in part by advertising. The ability to insert an advertisement in a broadcast stream (video, audio, or mailed) is an opportunity for advertiser 144. Content can also be broadcast over the Internet and combined with existing video services, in which case opportunities for the insertion of advertisements will be present.

Although FIG. 1A represents content/opportunity provider 160 and content server 162 as being independently connected to Internet 150, with the consumer's devices also being directly connected to the Internet 150, the content/opportunity provider 160 can also control access to the subscriber. This can occur when the content/opportunity provider is also the cable operator or telephone company. In such instances, the cable operator or telephone company can be providing content to consumer 100 over the cable operator/telephone company access network. As an example, if the cable operator has control over the content being transmitted to the consumer 100, and has programmed times for the insertion of advertisements, the cable operator is considered to be a content/opportunity provider 160 since the cable operator can provide advertisers the opportunity to access consumer 100 by inserting an advertisement at the commercial break.

In a preferred embodiment of the present invention, a pricing policy can be defined. The content/opportunity provider 160 can charge advertiser 144 for access to consumer 100 during an opportunity. In a preferred embodiment the price charged for access to consumer 100 by content/opportunity provider varies as a function of the applicability of the advertisement to consumer 100. In an alternate embodiment consumer 100 retains control of access to the profile and charges for viewing an advertisement.

The content provider can also be a mailing company or printer which is preparing printed information for consumer 100. As an example, content server 162 can be connected to a printer 164 which creates a mailed ad 182 for consumer 100. Alternatively, printer 164 can produce advertisements for insertion into newspapers which are delivered to consumer 100. Other printed material can be generated by printer 162 and delivered to consumer 100 in a variety of ways.

Advertiser 144 maintains an ad server 146 which contains a variety of advertisements in the form of still video which can be printed, video advertisements, audio advertisements, or combinations thereof.

Profiler 140 maintains a consumer profile server 130 which contains the characterization of consumer 100. The consumer profiling system is operated by profiler 140, who can use consumer profile server 130 or another computing device connected to consumer profile server 130 to profile consumer 100.

Data to perform the consumer profiling is received from a point of purchase 110. Point of purchase 110 can be a grocery store, department store, other retail outlet, or can be a web site or other location where a purchase request is received and processed. In a preferred embodiment, data from the point of purchase is transferred over a public or private network 120, such as a local area network within a store or a wide area network which connects a number of department or grocery stores. In an alternate embodiment the data from point of purchase 110 is transmitted over the Internet 150 to profiler 140.

Profiler 140 may be a retailer who collects data from its stores, but can also be a third party who contracts with consumer 100 and the retailer to receive point of purchase data and to profile the consumer 100. Consumer 100 may agree to such an arrangement based on the increased convenience offered by targeted ads, or through a compensation arrangement in which they are paid on a periodic basis for revealing their specific purchase records.

Consumer profile server 130 can contain a consumer profile which is determined from observation of the consumer's viewing habits on television 108 or consumer PC 104. A method and apparatus for determining demographic and product preference information based on the consumer's use of services such as cable television and Internet access is described in the co-pending application entitled "Subscriber characterization system," filed on Dec. 3, 1998, with Ser. No. 09/204,888 and in the co-pending application entitled "Client-server based subscriber characterization system," filed on Dec. 3, 1998, with Ser. No. 09/205,653, both of which are incorporated herein by reference but which are not admitted to be prior art. When used herein, the term consumer characterization vector also represents the subscriber characterization vector described in the aforementioned applications. Both the consumer characterization vector and the subscriber characterization vector contain demographic and product preference information which is related to consumer 100.

Figure 1B:
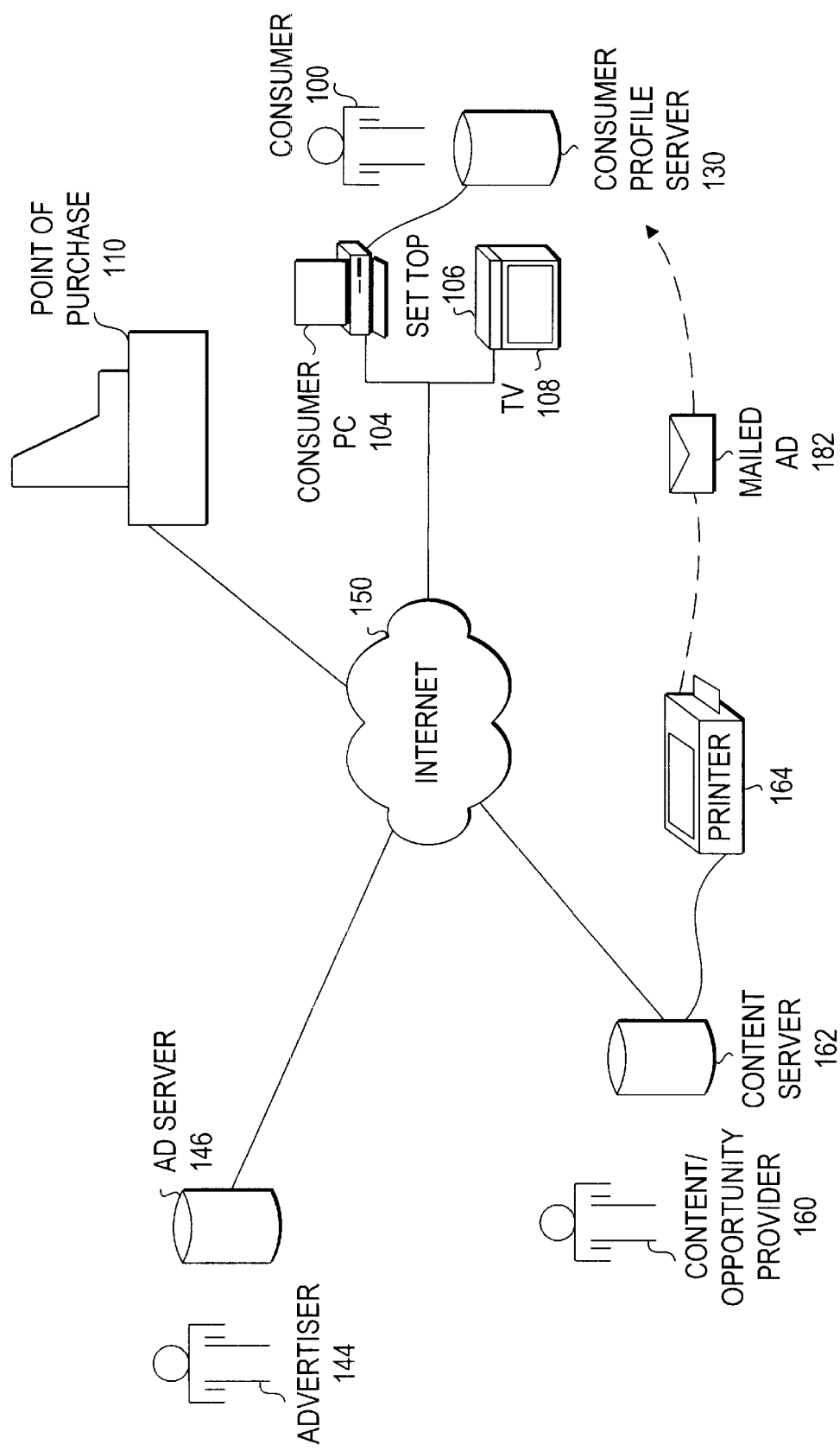

FIG. 1B illustrates an alternate embodiment of the present invention in which the consumer 100 is also profiler 140. Consumer 100 maintains consumer profile server 130 which is connected to a network, either directly or through consumer PC 104 or set top 106. Consumer profile server 130 can contain the consumer profiling system, or the profiling can be performed in conjunction with consumer PC 104 or set top 106. A subscriber characterization system which monitors the viewing habits of consumer 100 can be used in conjunction with the consumer profiling system to create a more accurate consumer profile.

When the consumer 100 is also the profiler 140, as shown in FIG. 1B, access to the consumer demographic and product preference characterization is controlled exclusively by consumer 100, who will grant access to the profile in return for receiving an increased accuracy of ads, for cash compensation, or in return for discounts or coupons on goods and services.

Figure 2A:
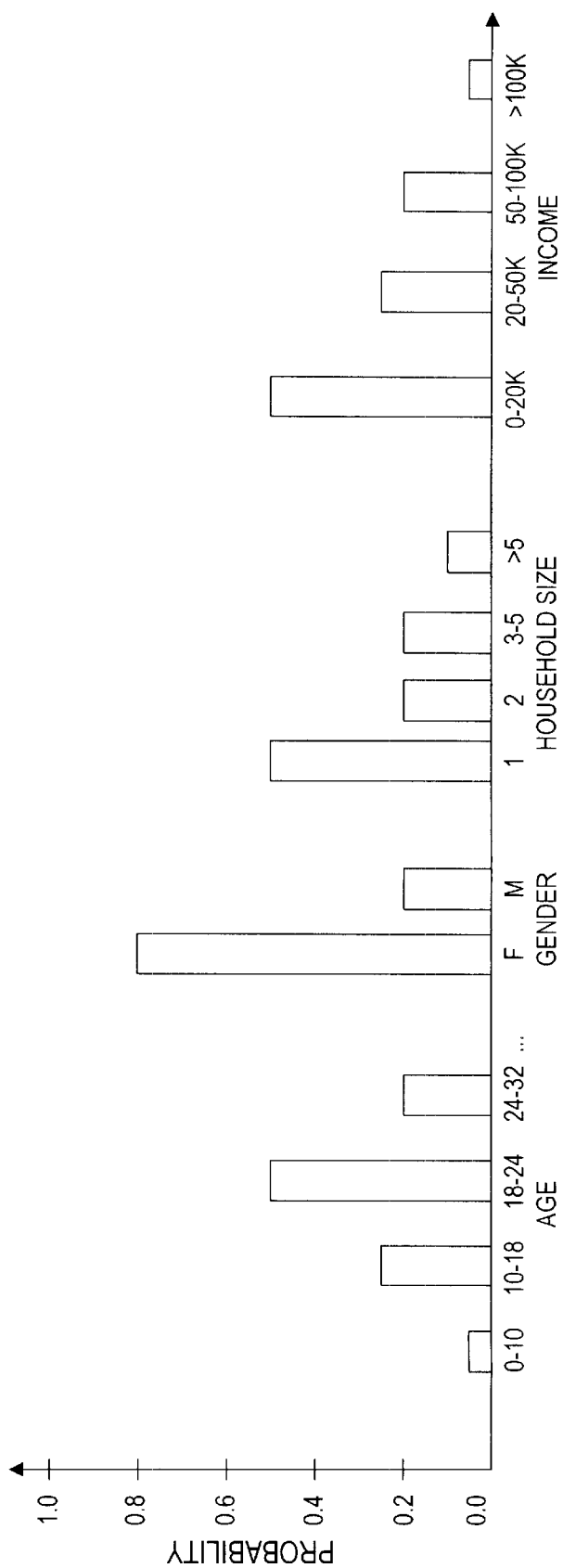
FIGS. 2A, 2B, 2C and 2D illustrate a probabilistic consumer demographic characterization vector, a deterministic consumer demographic characterization vector, a consumer product preference characterization vector, and a storage structure for consumer characterization vectors respectively.

FIG. 2A illustrates an example of a probabilistic demographic characterization vector. The demographic characterization vector is a representation of the probability that a consumer falls within a certain demographic category such as an age group, gender, household size, or income range.

In a preferred embodiment the demographic characterization vector includes interest categories. The interest categories may be organized according to broad areas such as music, travel, and restaurants. Examples of music interest categories include country music, rock, classical, and folk. Examples of travel categories include "travels to another state more than twice a year," and travels by plane more than twice a year."

Figure 2B:
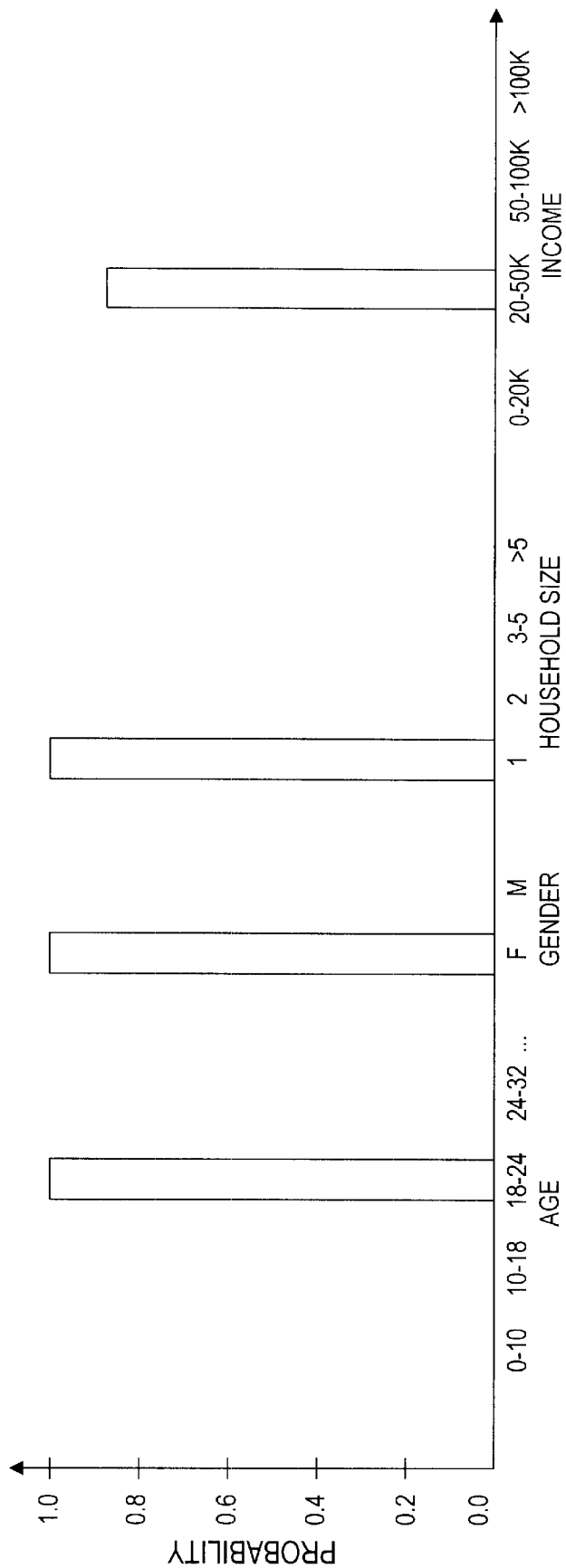

FIG. 2B illustrates a deterministic demographic characterization vector. The deterministic demographic characterization vector is a representation of the consumer profile as determined from deterministic rather than probabilistic data. As an example, if consumer 100 agrees to answer specific questions regarding age, gender, household size, income, and interests the data contained in the consumer characterization vector will be deterministic.

As with probabilistic demographic characterization vectors, the deterministic demographic characterization vector can include interest categories. In a preferred embodiment, consumer 100 answers specific questions in a survey generated by profiler 140 and administered over the phone, in written form, or via the Internet 150 and consumer PC 104. The survey questions correspond either directly to the elements in the probabilistic demographic characterization vector, or can be processed to obtain the deterministic results for storage in the demographic characterization vector.

Figure 2C:

FIG. 2C illustrates a product preference vector. The product preference represents the average of the consumer preferences over past purchases. As an example, a consumer who buys the breakfast cereal manufactured by Post under the trademark ALPHABITS about twice as often as purchasing the breakfast cereal manufactured by Kellogg under the trademark CORN FLAKES, but who never purchases breakfast cereal manufactured by General Mills under the trademark WHEATIES, would have a product preference characterization such as that illustrated in FIG. 2C. As shown in FIG. 2C, the preferred size of the consumer purchase of a particular product type can also be represented in the product preference vector.

Figure 2D:
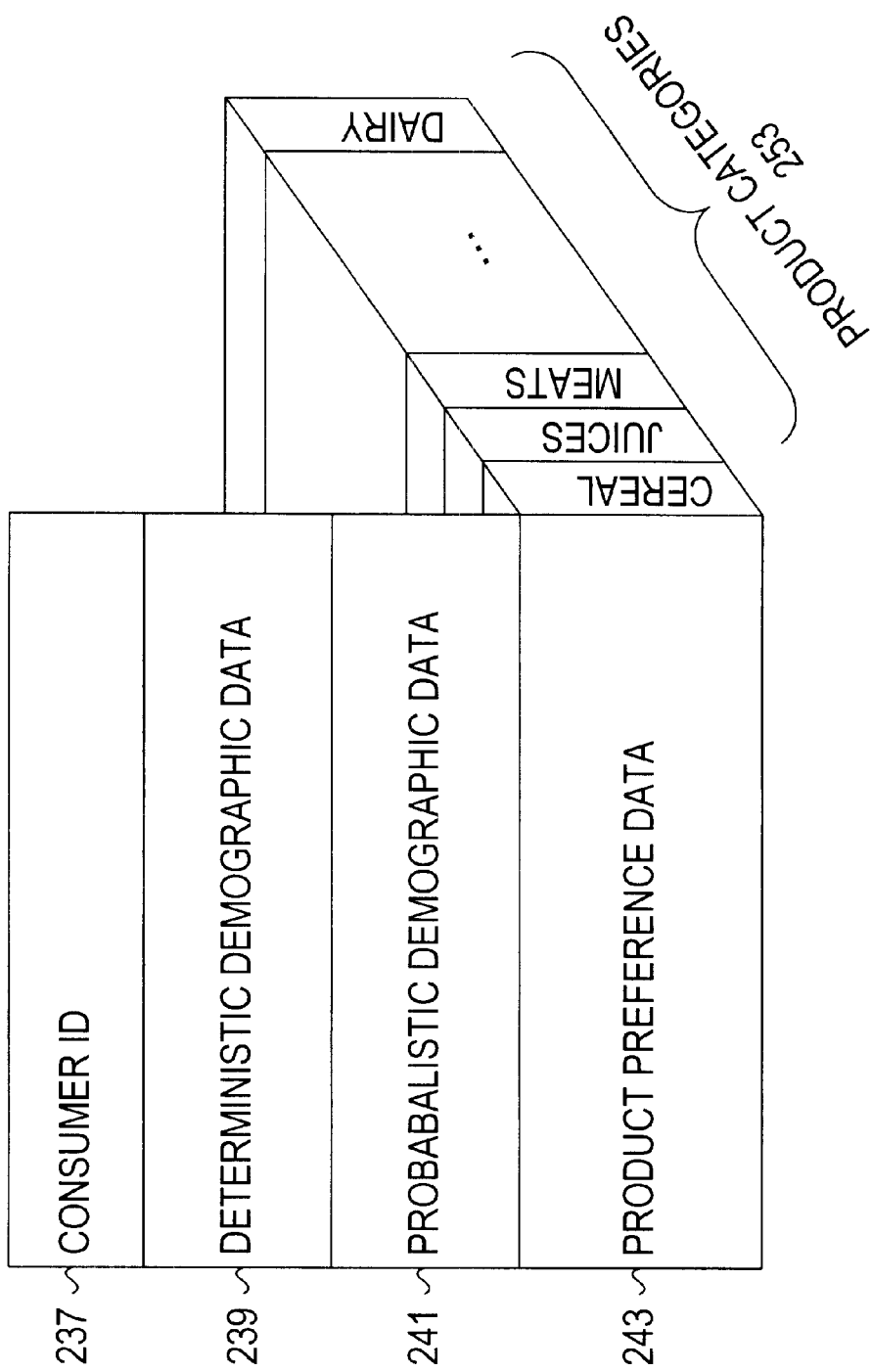

FIG. 2D represents a data structure for storing the consumer profile, which can be comprised of a consumer ID field 237, a deterministic demographic data field 239, a probabilistic demographic data field 241, and one or more product preference data fields 243. As shown in FIG. 2D, the product preference data field 243 can be comprised of multiple fields arranged by product categories 253.

Depending on the data structure used to store the information contained in the vector, any of the previously mentioned vectors may be in the form of a table, record, linked tables in a relational database, series of records, or a software object.

The consumer ID 512 can be any identification value uniquely associated with consumer 100. In a preferred embodiment consumer ID 512 is a telephone number, while in an alternate embodiment consumer ID 512 is a credit card number. Other unique identifiers include consumer name with middle initial or a unique alphanumeric sequence, the consumer address, social security number.

The vectors described and represented in FIGS. 2A–C form consumer characterization vectors that can be of varying length and dimension, and portions of the characterization vector can be used individually. Vectors can also be concatenated or summed to produce longer vectors which provide a more detailed profile of consumer 100. A matrix representation of the vectors can be used, in which specific elements, such a product categories 253, are indexed. Hierarchical structures can be employed to organize the vectors and to allow hierarchical search algorithms to be used to locate specific portions of vectors.

Figure 3A:
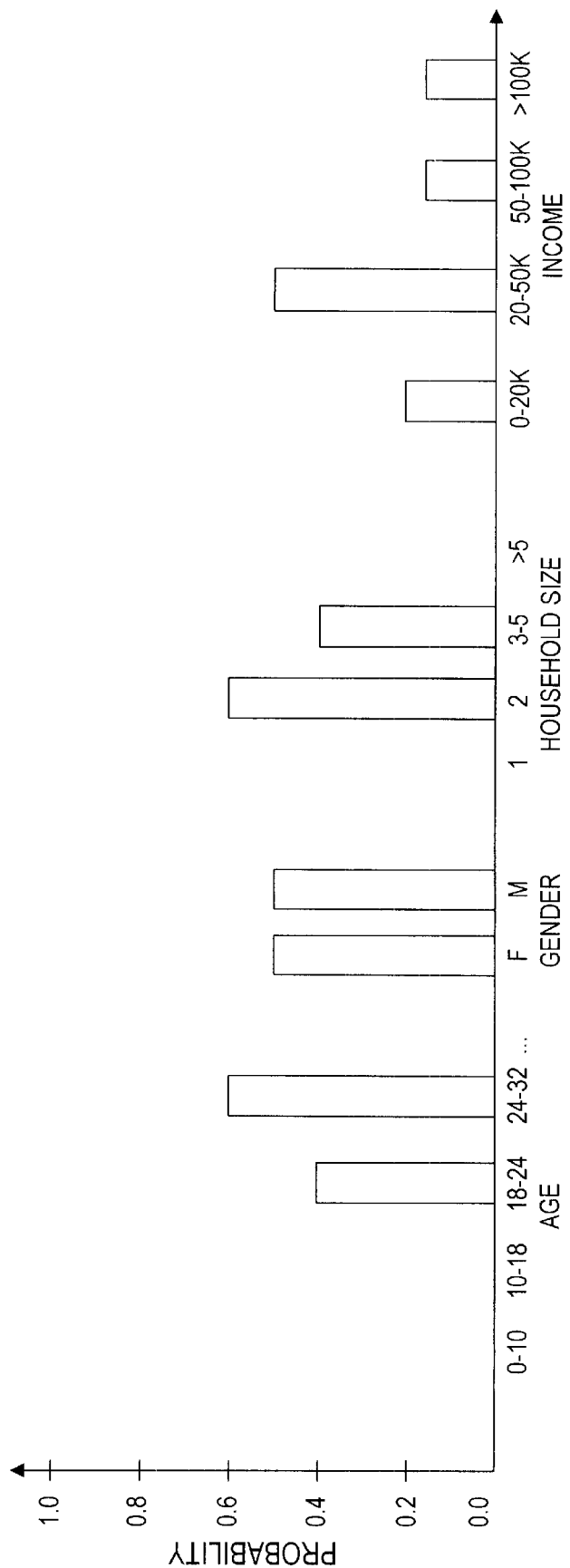
FIGS. 3A and 3B illustrate an advertisement demographic characterization vector and an advertisement product preference characterization vector respectively.
Figure 3B:
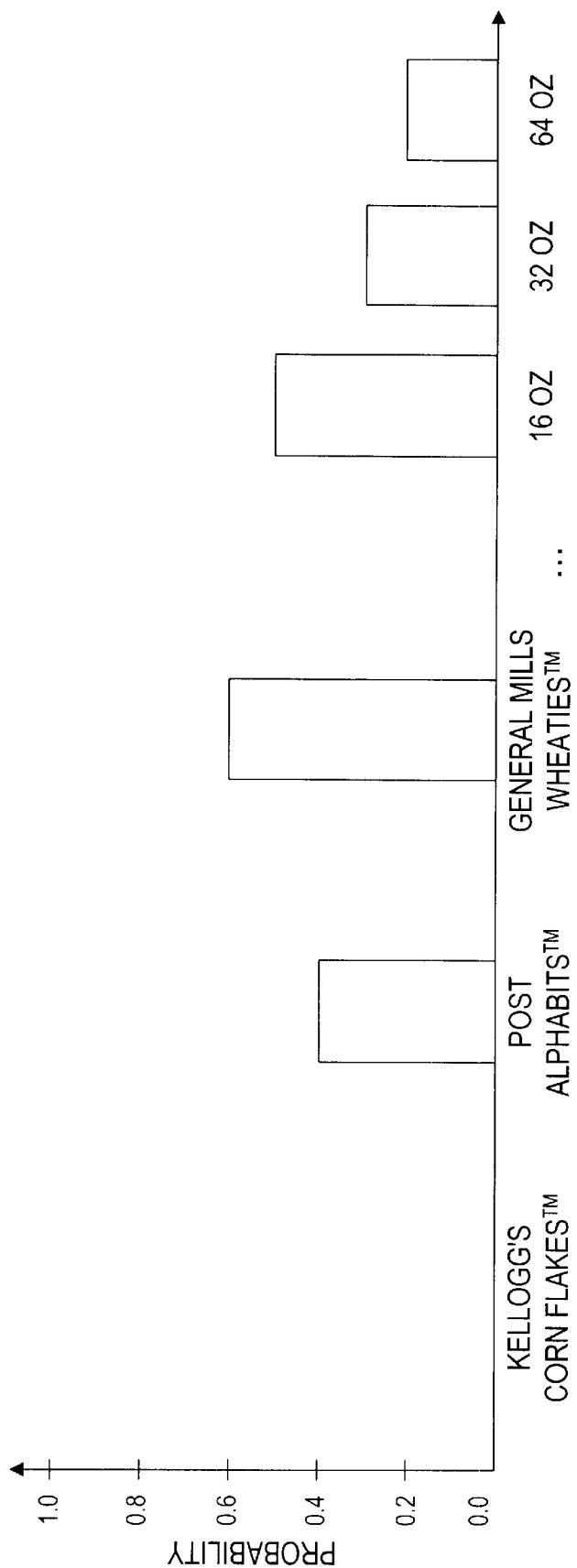

FIGS. 3A and 3B represent an ad demographics vector and an ad product preference vector respectively. The ad demographics vector, similar in structure to the demographic characterization vector, is used to target the ad by setting the demographic parameters in the ad demographics vector to correspond to the targeted demographic group. As an example, if an advertisement is developed for a market which is the 18–24 and 24–32 age brackets, no gender bias, with a typical household size of 2–5, and income typically in the range of $20,000–$50,000, the ad demographics vector would resemble the one shown in FIG. 3A. The ad demographics vector represents a statistical estimate of who the ad is intended for, based on the advertisers belief that the ad will be beneficial to the manufacturer when viewed by individuals in those groups. The benefit will typically be in the form of increased sales of a product or increased brand recognition. As an example, an "image ad" which simply shows an artistic composition but which does not directly sell a product may be very effective for young people, but may be annoying to older individuals. The ad demographics vector can be used to establish the criteria which will direct the ad to the demographic group of 18–24 year olds.

FIG. 3B illustrates an ad product preference vector. The ad product preference vector is used to select consumers which have a particular product preference. In the example illustrated in FIG. 3B, the ad product preference vector is set so that the ad can be directed at purchasers of ALPHABITS and WHEATIES, but not at purchasers of CORN FLAKES. This particular setting would be useful when the advertiser represents Kellogg and is charged with increasing sales of CORN FLAKES. By targeting present purchasers of ALPHABITS and WHEATIES, the advertiser can attempt to sway those purchasers over to the Kellogg brand and in particular convince them to purchase CORN FLAKES. Given that there will be a payment required to present the advertisement, in the form of a payment to the content/ opportunity provider 160 or to the consumer 100, the advertiser 144 desires to target the ad and thereby increase its cost effectiveness.

In the event that advertiser 144 wants to reach only the purchasers of Kellogg's CORN FLAKES, that category would be set at a high value, and in the example shown would be set to 1. As shown in FIG. 3B, product size can also be specified. If there is no preference to size category the values can all be set to be equal. In a preferred embodiment the values of each characteristic including brand and size are individually normalized.

Because advertisements can be targeted based on a set of demographic and product preference considerations which may not be representative of any particular group of present consumers of the product, the ad characterization vector can be set to identify a number of demographic groups which would normally be considered to be uncorrelated. Because the ad characterization vector can have target profiles which are not representative of actual consumers of the product, the ad characterization vector can be considered to have discretionary elements. When used herein the term discretionary refers to a selection of target market characteristics which need not be representative of an actual existing market or single purchasing segment.

In a preferred embodiment the consumer characterization vectors shown in FIGS. 2A–C and the ad characterization vectors represented in FIGS. 3A and 3B have a standardized format, in which each demographic characteristic and product preference is identified by an indexed position. In a preferred embodiment the vectors are singly indexed and thus represent coordinates in n-dimensional space, with each dimension representing a demographic or product preference characteristic. In this embodiment a single value represents one probabilistic or deterministic value (e.g. the probability that the consumer is in the 18–24 year old age group, or the weighting of an advertisement to the age group).

In an alternate embodiment a group of demographic or product characteristics forms an individual vector. As an example, age categories can be considered a vector, with each component of the vector representing the probability that the consumer is in that age group. In this embodiment each vector can be considered to be a basis vector for the description of the consumer or the target ad. The consumer or ad characterization is comprised of a finite set of vectors in a vector space that describes the consumer or advertisement.

Figure 4:
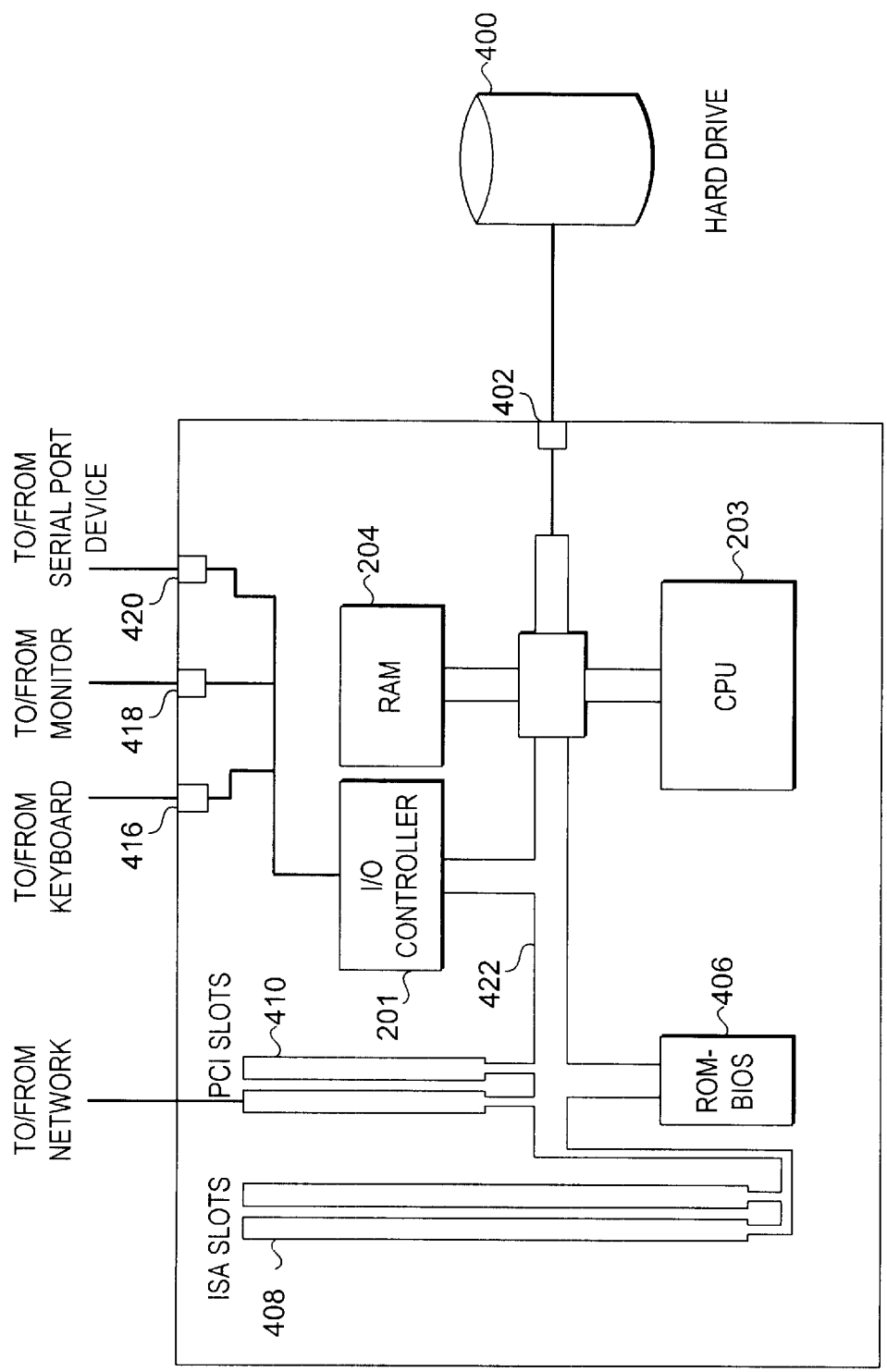
FIG. 4 illustrates a computer system on which the present invention can be realized.

FIG. 4 shows the block diagram of a computer system for a realization of the consumer profiling system. A system bus 422 transports data amongst the CPU 203, the RAM 204, Read Only Memory—Basic Input Output System (ROM-BIOS) 406 and other components. The CPU 203 accesses a hard drive 400 through a disk controller 402. The standard input/output devices are connected to the system bus 422 through the I/O controller 201. A keyboard is attached to the I/O controller 201 through a keyboard port 416 and the monitor is connected through a monitor port 418. The serial port device uses a serial port 420 to communicate with the I/O controller 201. Industry Standard Architecture (ISA) expansion slots 408 and Peripheral Component Interconnect (PCI) expansion slots 410 allow additional cards to be placed into the computer. In a preferred embodiment, a network card is available to interface a local area, wide area, or other network. The computer system shown in FIG. 4 can be part of consumer profile server 130, or can be a processor present in another element of the network.

Figure 5:
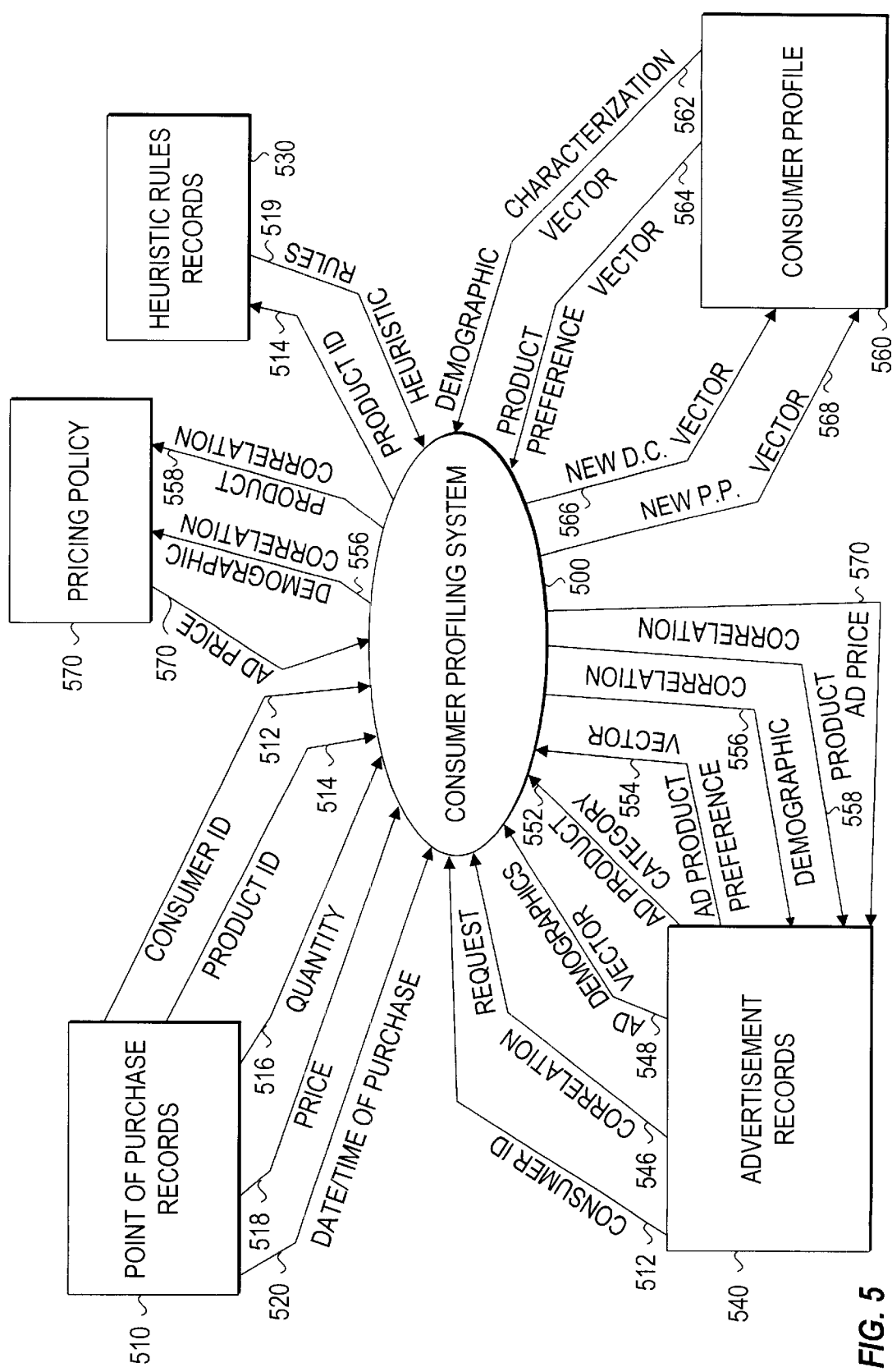
FIG. 5 illustrates a context diagram for the present invention.

FIG. 5 shows a context diagram for the present invention. Context diagrams are useful in illustrating the relationship between a system and external entities. Context diagrams can be especially useful in developing object oriented implementations of a system, although use of a context diagram does not limit implementation of the present invention to any particular programming language. The present invention can be realized in a variety of programming languages including but not limited to C, C++, Smalltalk, Java, Perl, and can be developed as part of a relational database. Other languages and data structures can be utilized to realize the present invention and are known to those skilled in the art.

Referring to FIG. 5, in a preferred embodiment consumer profiling system 500 is resident on consumer profile server 130. Point of purchase records 510 are transmitted from point of purchase 110 and stored on consumer profile server 130. Heuristic rules 530, pricing policy 570, and consumer profile 560 are similarly stored on consumer profile server 130. In a preferred embodiment advertisement records 540 are stored on ad server 146 and connectivity between advertisement records 540 and consumer profiling system 500 is via the Internet or other network.

In an alternate embodiment the entities represented in FIG. 5 are located on servers which are interconnected via the Internet or other network.

Consumer profiling system 500 receives purchase information from a point of purchase, as represented by point of purchase records 510. The information contained within the point of purchase records 510 includes a consumer ID 512, a product ID 514 of the purchased product, the quantity 516 purchased and the price 518 of the product. In a preferred embodiment, the date and time of purchase 520 are transmitted by point of purchase records 510 to consumer profiling system 500.

The consumer profiling system 500 can access the consumer profile 560 to update the profiles contained in it. Consumer profiling system 500 retrieves a consumer characterization vector 562 and a product preference vector 564. Subsequent to retrieval one or more data processing algorithms are applied to update the vectors. An algorithm for updating is illustrated in the flowchart in FIG. 8A. The updated vectors termed herein as new demographic characterization vector 566 and new product preference 568 are returned to consumer profile 560 for storage.

Consumer profiling system 500 can determine probabilistic consumer demographic characteristics based on product purchases by applying heuristic rules 519. Consumer profiling system 500 provides a product ID 514 to heuristic rules records 530 and receives heuristic rules associated with that product. Examples of heuristic rules are illustrated in FIG. 7.

In a preferred embodiment of the present invention, consumer profiling system 500 can determine the applicability of an advertisement to the consumer 100. For determination of the applicability of an advertisement, a correlation request 546 is received by consumer profiling system 500 from advertisements records 540, along with consumer ID 512. Advertisements records 540 also provide advertisement characteristics including an ad demographic vector 548, an ad product category 552 and an ad product preference vector 554.

Application of a correlation process, as will be described in accordance with FIG. 8B, results in a demographic correlation 556 and a product correlation 558 which can be returned to advertisement records 540. In a preferred embodiment, advertiser 144 uses product correlation 558 and demographic correlation 556 to determine the applicability of the advertisement and to determine if it is worth purchasing the opportunity. In a preferred embodiment, pricing policy 570 is utilized to determine an ad price 570 which can be transmitted from consumer profiling system 500 to advertisement records 540 for use by advertiser 144.

Figure 9:
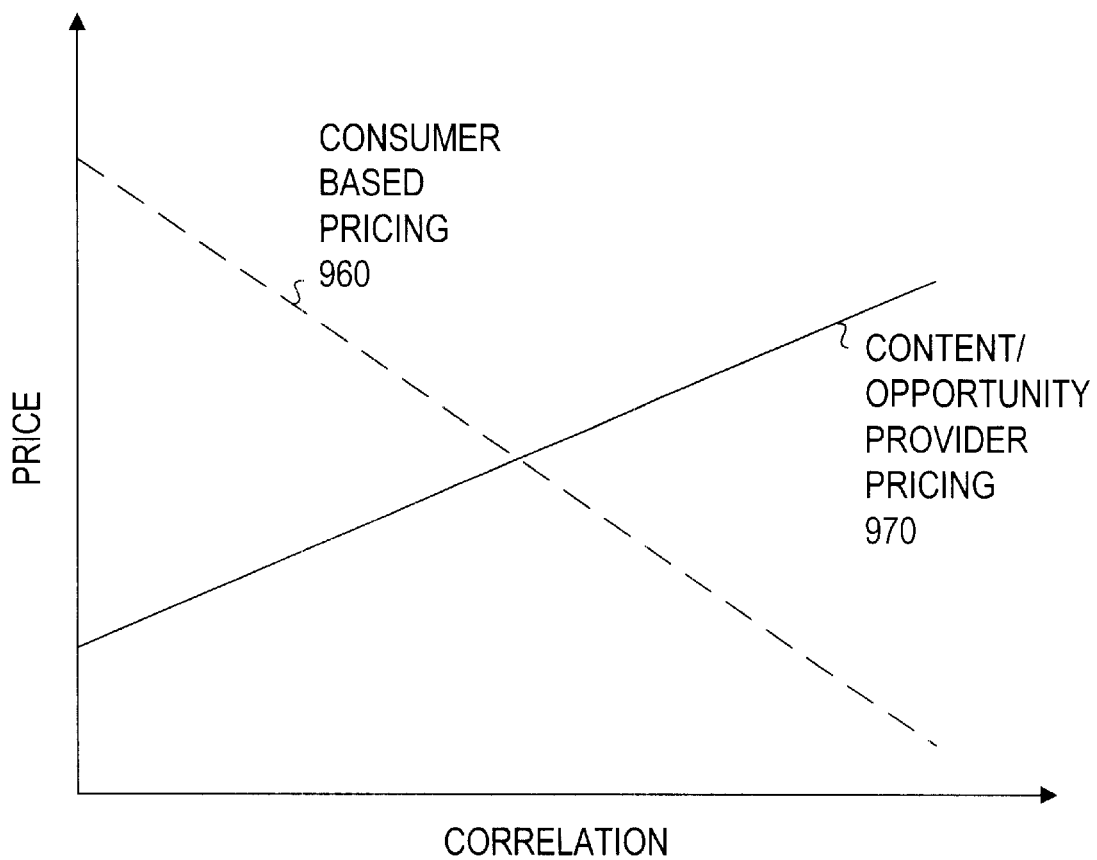
FIG. 9 represents pricing as a function of correlation.

Pricing policy 570 is accessed by consumer profiling system 500 to obtain ad price 572. Pricing policy 570 takes into consideration results of the correlation provided by the consumer profiling system 500. An example of pricing schemes are illustrated in FIG. 9

FIGS. 6A and 6B illustrate pseudocode for the updating process and for a correlation operation respectively. The updating process involves utilizing purchase information in conjunction with heuristic rules to obtain a more accurate representation of consumer 100, stored in the form of a new demographic characterization vector 562 and a new product preference vector 568.

As illustrated in the pseudocode in FIG. 6A the point of purchase data are read and the products purchase are integrated into the updating process. Consumer profiling system 500 retrieves a product demographics vector obtained from the set of heuristic rules 519 and applies the product demographics vector to the demographics characterization vector 562 and the product preference vector 564 from the consumer profile 560.

The updating process as illustrated by the pseudocode in FIG. 6A utilizes a weighting factor which determines the importance of that product purchase with respect to all of the products purchased in a particular product category. In a preferred embodiment the weight is computed as the ratio of the total of products with a particular product ID 514 purchased at that time, to the product total purchase, which is the total quantity of the product identified by its product ID 514 purchased by consumer 100 identified by its consumer ID 512, purchased over an extended period of time. In a preferred embodiment the extended period of time is one year.

In the preferred embodiment the product category total purchase is determined from a record containing the number of times that consumer 100 has purchased a product identified by a particular product ID.

In an alternate embodiment other types of weighting factors, running averages and statistical filtering techniques can be used to use the purchase data to update the demographic characterization vector. The system can also be reset to clear previous demographic characterization vectors and product preference vectors.

The new demographic characterization vector 566 is obtained as the weighted sum of the product demographics vector and the demographic characterization vector 562. The same procedure is performed to obtain the new product preference vector 568. Before storing those new vectors, a normalization is performed on the new vectors. When used herein the term product characterization information refers to product demographics vectors, product purchase vectors or heuristic rules, all of which can be used in the updating process. The product purchase vector refers to the vector which represents the purchase of an item represented by a product ID. As an example, a product purchase vector for the purchase of Kellogg's CORN FLAKES in a 32 oz. size has a product purchase vector with a unity value for Kellogg's CORN FLAKES and in the 32 oz. size. In the updating process the weighted sum of the purchase as represented by the product purchase vector is added to the product preference vector to update the product preference vector, increasing the estimated probability that the consumer will purchase Kellogg's CORN FLAKES in the 32 oz. size.

In FIG. 6B the pseudocode for a correlation process is illustrated. Consumer profiling system 500, after receiving the product characteristics and the consumer ID 512 from the advertisement records retrieves the consumer demographic characterization vector 562 and its product preference vector 564. The demographic correlation is the correlation between the demographic characterization vector 562 and the ad demographics vector. The product correlation is the correlation between the ad product preference vector 554 and the product preference vector 564.

In a preferred embodiment the correlation process involves computing the dot product between vectors. The resulting scalar is the correlation between the two vectors.

Figure 10:
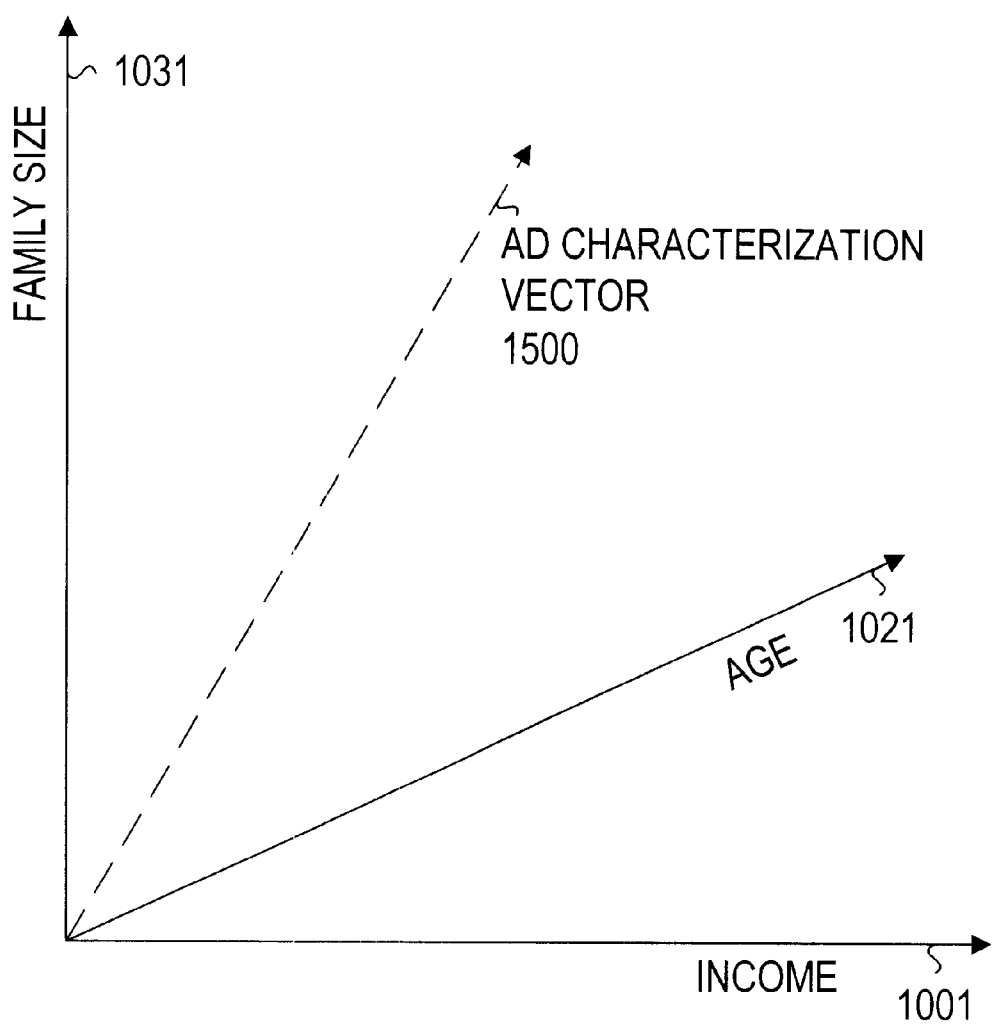
FIG. 10 illustrates a representation of a consumer characterization as a set of basis vectors and an ad characterization vector.
Figure 5:
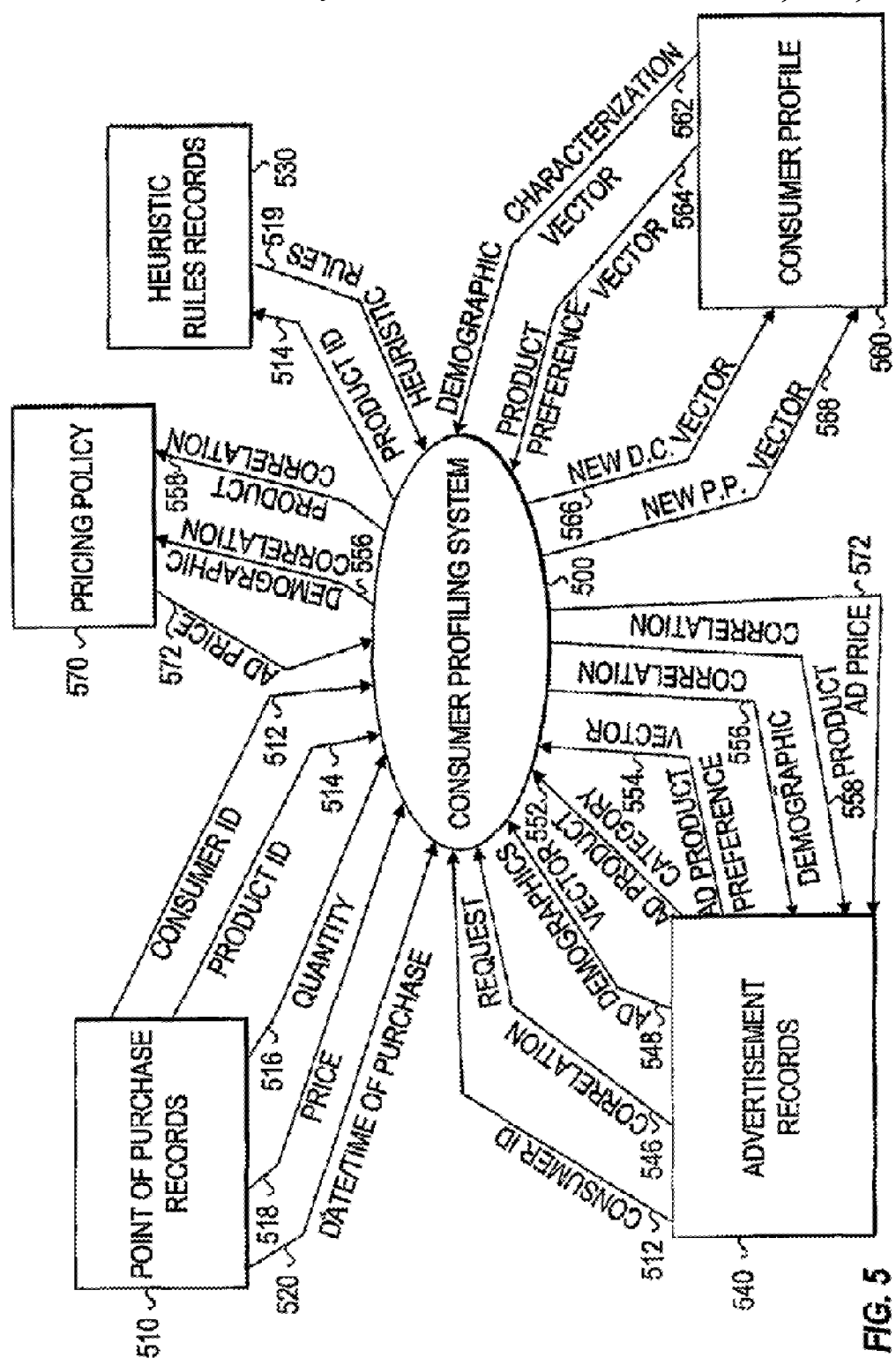

In an alternate embodiment, as illustrated in FIG. 10, the basis vectors which describe aspects of the consumer can be used to calculate the projections of the ad vector on those basis vectors. In this embodiment, the result of the ad correlation can itself be in vector form whose components represent the degree of correlation of the advertisement with each consumer demographic or product preference feature. As shown in FIG. 10 the basis vectors are the age of the consumer 1021, the income of the consumer 1001, and the family size of the consumer 1031. The ad characterization vector 1500 represents the desired characteristics of the target audience, and can include product preference as well as demographic characteristics.

In this embodiment the degree of orthogonality of the basis vectors will determine the uniqueness of the answer. The projections on the basis vectors form a set of data which represent the corresponding values for the parameter measured in the basis vector. As an example, if household income is one basis vector, the projection of the ad characterization vector on the household income basis vector will return a result indicative of the target household income for that advertisement.

Because basis vectors cannot be readily created from some product preference categories (e.g. cereal preferences) an alternate representation to that illustrated in FIG. 2C can be utilized in which the product preference vector represents the statistical average of purchases of cereal in increasing size containers. This vector can be interpreted as an average measure of the cereal purchased by the consumer in a given time period.

The individual measurements of correlation as represented by the correlation vector can be utilized in determining the applicability of the advertisement to the subscriber, or a sum of correlations can be generated to represent the overall applicability of the advertisement.

In a preferred embodiment individual measurements of the correlations, or projections of the ad characteristics vector on the consumer basis vectors, are not made available to protect consumer privacy, and only the absolute sum is reported. In geometric terms this can be interpreted as disclosure of the sum of the lengths of the projections rather than the actual projections themselves.

In an alternate embodiment the demographic and product preference parameters are grouped to form sets of paired scores in which elements in the consumer characterization vector are paired with corresponding elements of the ad characteristics vector. A correlation coefficient such as the Pearson product-moment correlation can be calculated. Other methods for correlation can be employed and are well known to those skilled in the art.

When the consumer characterization vector and the ad characterization vector are not in a standardized format, a transformation can be performed to standardize the order of the demographic and product preferences, or the data can be decomposed into sets of basis vectors which indicate particular attributes such as age, income or family size.

FIG. 7 illustrates an example of heuristic rules including rules for defining a product demographics vector. From the product characteristics, a probabilistic determination of household demographics can be generated. Similarly, the monthly quantity purchased can be used to estimate household size. The heuristic rules illustrated in FIG. 7 serve as an example of the types of heuristic rules which can be employed to better characterize consumer 100 as a result of their purchases. The heuristic rules can include any set of logic tests, statistical estimates, or market studies which provide the basis for better estimating the demographics of consumer 100 based on their purchases.

Figure 8A:
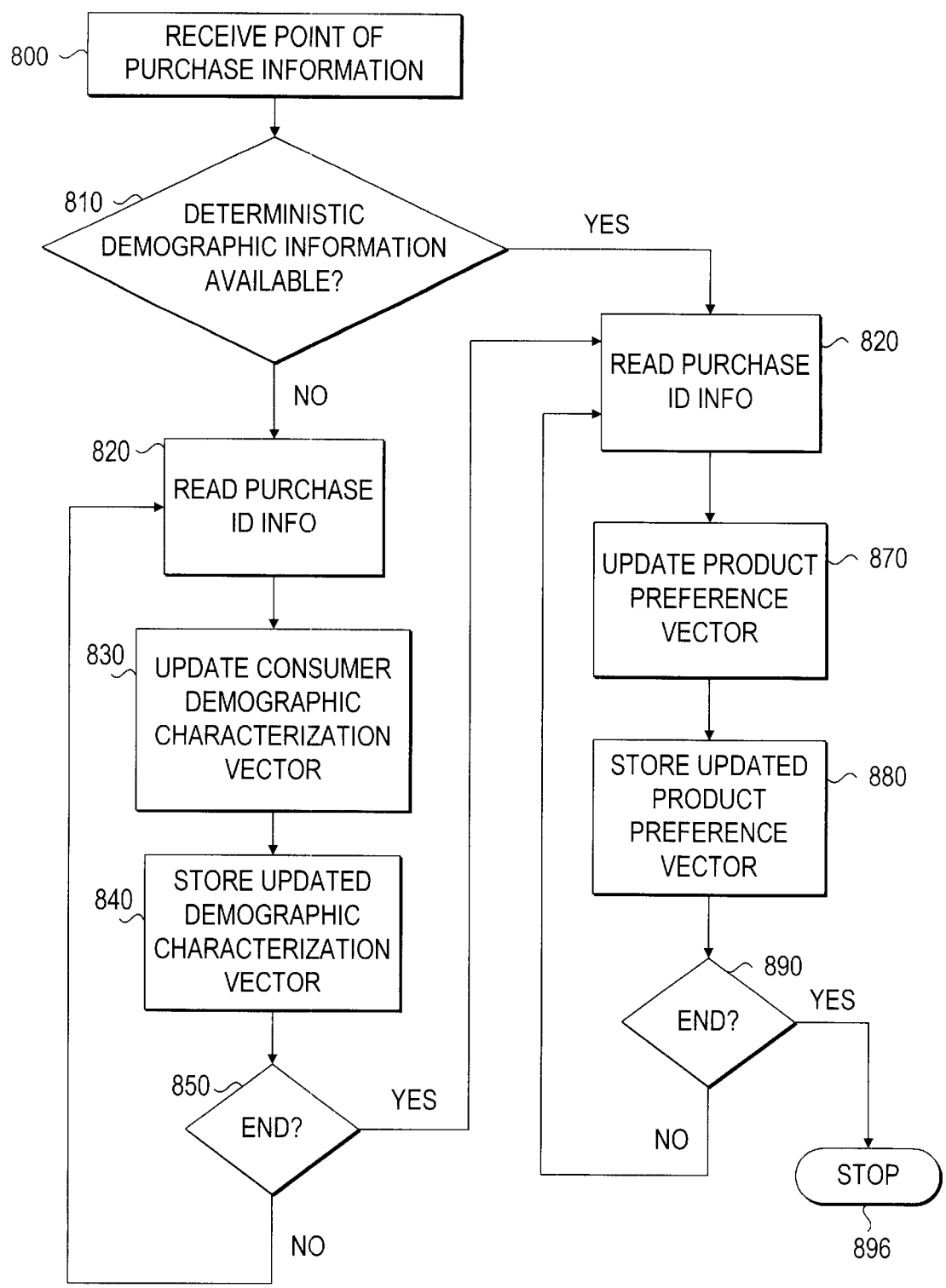
FIGS. 8A and 8B illustrate flowcharts for updating consumer characterization vectors and a correlation operation respectively.

In FIG. 8A the flowchart for updating the consumer characterization vectors is depicted. The system receives data from the point of purchase at receive point of purchase information step 800. The system performs a test to determine if a deterministic demographic characterization vector is available at deterministic demographic information available step 810 and, if not, proceeds to update the demographic characteristics.

Referring to FIG. 8A, at read purchase ID info step 820, the product ID 514 is read, and at update consumer demographic characterization vector step 830, an algorithm such as that represented in FIG. 6A is applied to obtain a new demographic characterization vector 566, which is stored in the consumer profile 560 at store updated demographic characterization vector step 840.

The end test step 850 can loop back to the read purchase ID info 820 if all the purchased products are not yet processed for updating, or continue to the branch for updating the product preference vector 564. In this branch, the purchased product is identified at read purchase ID info step 820. An algorithm, such as that illustrated in FIG. 6A for updating the product preference vector 564, is applied in update product preference vector step 870. The updated vector is stored in consumer profile 560 at store product preference vector step 880. This process is carried out until all the purchased items are integrated in the updating process.

Figure 8B:
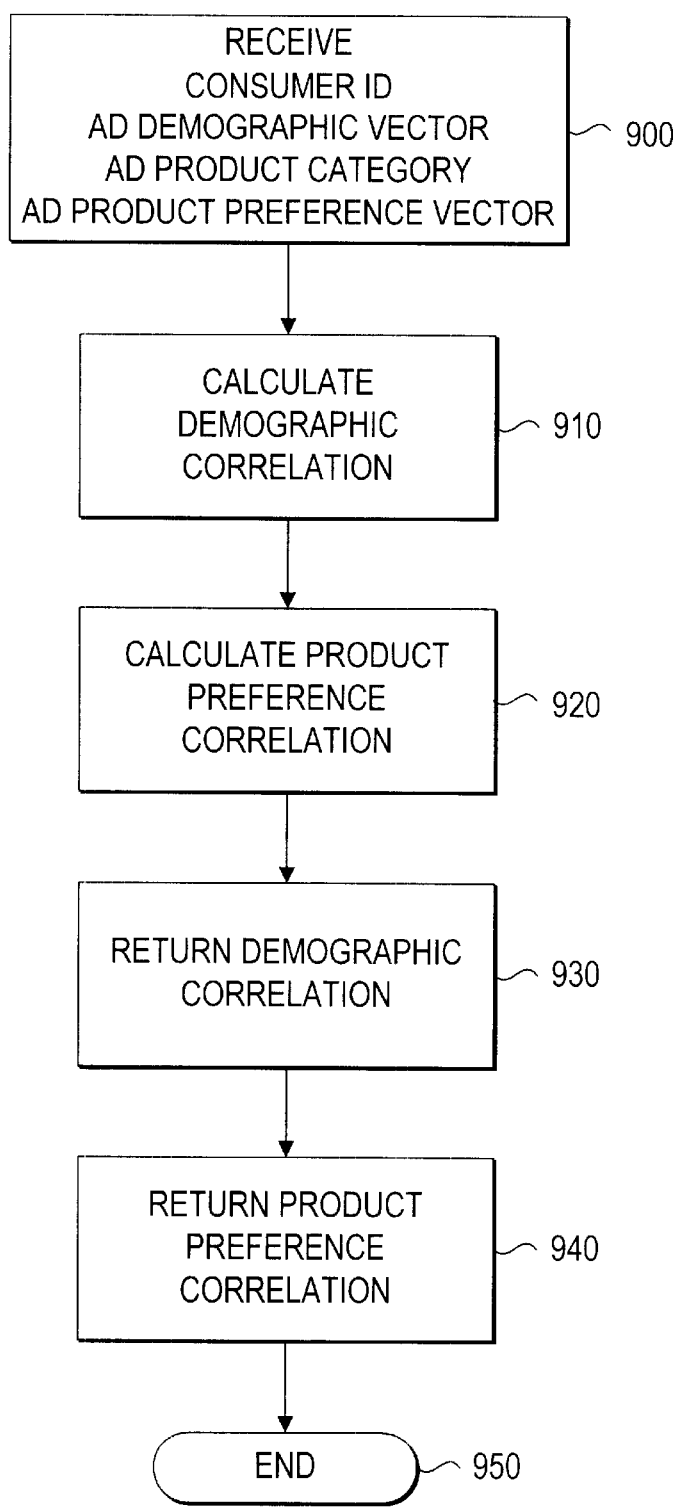

FIG. 8B shows a flowchart for the correlation process. At step 900 the advertisement characteristics described earlier in accordance with FIG. 5 along with the consumer ID are received by consumer profiling system 500. At step 910 the demographic correlation 556 is computed and at step 920 the product preference correlation 558 is computed. An illustrative example of an algorithm for correlation is presented in FIG. 6b. The system returns demographic correlation 556 and product preference correlation 558 to the advertisement records 540 before exiting the procedure at end step 950.

FIG. 9 illustrates two pricing schemes, one for content/opportunity provider 160 based pricing 970, which shows increasing cost as a function of correlation. In this pricing scheme, the higher the correlation, the more the content/opportunity provider 160 charges to air the advertisement.

FIG. 9 also illustrates consumer based pricing 960, which allows a consumer to charge less to receive advertisements which are more highly correlated with their demographics and interests.

As an example of the industrial applicability of the invention, a consumer 100 can purchase items in a grocery store which also acts as a profiler 140 using a consumer profiling system 500. The purchase record is used by the profiler to update the probabilistic representation of customer 100, both in terms of their demographics as well as their product preferences. For each item purchased by consumer 100, product characterization information in the form of a product demographics vector and a product purchase vector is used to update the demographic characterization vector and the product preference vector for consumer 100.

A content/opportunity provider 160 may subsequently determine that there is an opportunity to present an advertisement to consumer 100. Content/opportunity provider 160 can announce this opportunity to advertiser 144 by transmitting the details regarding the opportunity and the consumer ID 512. Advertiser 144 can then query profiler 140 by transmitting consumer ID 512 along with advertisement specific information including the correlation request 546 and ad demographics vector 548. The consumer profiling system 500 performs a correlation and determines the extent to which the ad target market is correlated with the estimated demographics and product preferences of consumer 100. Based on this determination advertiser 144 can decide whether to purchase the opportunity or not.

Although this invention has been illustrated by reference to specific embodiments, it will be apparent to those skilled in the art that various changes and modifications may be made which clearly fall within the scope of the invention. The invention is intended to be protected broadly within the spirit and scope of the appended claims.

What is claimed is:

1. A method for determining if an advertisement is applicable to a consumer based on similarities between a consumer profile associated with the consumer and an advertisement profile associated with the advertisement, the method comprising:

retrieving transaction records, wherein the transaction records include an inventory of recorded transactions of the consumer;

generating the consumer profile based at least in part on the transaction records and heuristic rules associated with at least some subset of the recorded transactions within the transaction records, wherein the heuristic rules define a probabilistic measure of at least one discretionary characteristic of the consumer not directly represented in the transaction records and the consumer profile identifies at least one probabilistic discretionary characteristic of the consumer that is not directly represented in the transaction records;

retrieving an advertisement profile associated with an advertisement, wherein the advertisement profile identifies at least one discretionary characteristic of an intended market for the advertisement; and correlating the consumer profile with the advertisement profile to determine the applicability of the advertisement to the consumer based on similarities of the at least one probabilistic discretionary characteristic of the consumer with the at least one discretionary characteristic for the intended market for the advertisement.

2. The method of claim 1, wherein the at least one probabilistic discretionary characteristic of the consumer included in the consumer profile identifies at least some subset of a probabilistic demographic characteristic, a probabilistic product preference characteristic, and probabilistic interest characteristic; and the at least one discretionary characteristic for to intended market for the advertisement included in the advertisement profile identifies at least some subset of a demographic characteristic, a probabilistic product preference characteristic, and probabilistic interest characteristic.

3. The method of claim 1, wherein
the discretionary characteristics included in the consumer profile are generated based on transactions in a first field; and
the advertisement associated with the advertisement profile is for a second field.

4. The method of claim 3, wherein the first field and to second field differ based on at least some subset of product, service, or industry.

5. The method of claim 1, wherein the discretionary characteristics are used to target advertisements to the consumer that typically would not be directly linked with the transactions.

6. The method of claim 1, wherein the consumer profile further includes deterministic information about the consumer.

7. The method of claim 1, wherein the consumer profile further includes transaction related traits.

8. The method of claim 1, wherein the recorded transactions include consumer purchases.

9. The method of claim 1, wherein the recorded transactions include consumer television interactions.

10. The method of claim 1, wherein the recorded transactions include consumer Internet usage.

11. The method of claim 7, wherein the transaction related traits include purchasing habits.

12. The method of claim 7, wherein the transaction related traits include television viewing habits.

13. The method of claim 7, wherein the transaction related traits include Internet usage habits.

14. The method of claim 1, further comprising selecting targeted advertisements based on said correlating.

15. The method of claim 14, further comprising presenting the targeted advertisements to the consumer.

16. The method of claim 15, wherein said presenting includes presenting the advertisement to the consumer via at least some subset of a television, Internet, mail, point-of-sale checkout, and kiosk.

17. The method of claim 14, wherein the targeted advertisements are at least some subset of television commercial, Internet advertisement, in store advertisement and coupon.

18. The method of claim 1, wherein
the heuristic rules define a probabilistic measure of at least one demographic characteristic of the consumer;
the consumer profile identifies at least one probabilistic demographic characteristic of the consumer; and
the advertisement profile identifies at least one demographic characteristic of an intended market for the advertisement.

19. The method of claim 1, wherein
the heuristic rules define a probabilistic measure of at least one product preference characteristic of the consumer not directly represented in the transaction records;
the consumer profile identifies at least one probabilistic product preference characteristic of the consumer that is not directly represented in the transaction records; and
the advertisement profile identifies at least one product preference characteristic of an intended market for the advertisement.

20. The method of claim 15, further comprising determining a price to present the advertisement to the consumer.

21. The method of claim 20, wherein the price is based on said correlating.

22. The method of claim 20, wherein the price is an increasing monotonic function based on the similarities determined in said correlating.

23. The method of claim 20, wherein the price is a decreasing monotonic function based on the similarities determined in said correlating.

24. The method of claim 1, wherein
said retrieving an advertisement profile includes retrieving a plurality of advertisement profiles, each of the advertisement profiles including discretionary characteristics of an intended target market of an associated advertisement; and
said correlating includes correlating the consumer profile with each of the plurality of advertisement profiles.

25. A system for determining if an advertisement is applicable to a consumer based on similarities between a consumer profile associated with the consumer and an advertisement profile associated with the advertisement, the system comprising:
means for retrieving transaction records, wherein the transaction records include an inventory of recorded transactions of the consumer;
means for generating the consumer profile based at least in part on the transaction records and heuristic rules associated with at least some subset of the recorded transactions within the transaction records, wherein the heuristic rules define a probabilistic measure of at least one discretionary characteristic of the consumer not directly represented in the transaction records and the consumer profile identifies ax least one probabilistic discretionary characteristic of the consumer that is not directly represented in the transaction records;
means for retrieving an advertisement profile associated with an advertisement, wherein the advertisement profile identifies at least one discretionary characteristic of an intended market for the advertisement; and
means for correlating the consumer profile with the advertisement profile to determine the applicability of the advertisement to the consumer based on similarities of the at least one probabilistic discretionary characteristic of the consumer with the at least one discretionary characteristic for the intended market for the advertisement.

26. The system of claim 25, wherein
the at least one probabilistic discretionary characteristic of the consumer included in the consumer profile identifies at least some subset of a probabilistic demographic characteristic, a probabilistic product preference characteristic, and probabilistic interest characteristic; and
the at least one discretionary characteristic for the intended market for the advertisement included in the advertisement profile identifies at least some subset of a demographic characteristic, a probabilistic product preference characteristic, and probabilistic interest characteristic.

27. The system of claim 25, wherein
the discretionary characteristics included in the consumer profile are generated based on transactions in a first field; and
the advertisement associated with the advertisement profile is for a second field.

28. The system of claim 27, wherein the first field and the second field differ based on at least some subset of product, service, or industry.

29. The system of claim 25, wherein the discretionary characteristics are used to target advertisements to the consumer that typically would not be directly linked with the transactions.

30. The system of claim 25, further comprising means for selecting targeted advertisements based on said correlating.

31. The system of claim 30, further comprising means for presenting the targeted advertisements to the consumer.

32. The system of claim 31, wherein said means for presenting include at least sane subset of a television, Internet, mail, point-of-sale checkout, and kiosk.

33. The system of claim 30, wherein the targeted advertisements are at least some subset of television commercial, Internet advertisement, in store advertisement and coupon.

34. A computer program embodied on a computer readable medium for determining if an advertisement is applicable to a consumer based on similarities between a consumer profile associated with the consumer and an advertisement profile associated with the advertisement, the computer program comprising:
   a source code segment for retrieving transaction records, wherein the transaction records include an inventory of recorded transactions of the consumer;
   a source code segment for generating the consumer profile based at least in part on the transaction records and heuristic rules associated with at least some subset of the recorded transactions within the transaction records, wherein the heuristic rules define a probabilistic measure of at least one discretionary characteristic of the consumer not directly represented in the transaction records and the consumer profile identifies at least one probabilistic discretionary characteristic of the consumer that is not directly represented in the transaction records;
   a source code segment for retrieving an advertisement profile associated with an advertisement, wherein the advertisement profile identifies at least one discretionary characteristic of an intended market for the advertisement; and
   a source code segment for correlating the consumer profile with the advertisement profile to determine the applicability of the advertisement to the consumer based on similarities of the at least one probabilistic discretionary characteristic of the consumer with the at least one discretionary characteristic for the intended market for the advertisement.

35. The computer program of claim 34, wherein
   the at least one probabilistic discretionary characteristic of the consumer included in the consumer profile identifies at least some subset of a probabilistic demographic characteristic, a probabilistic product preference characteristic, and probabilistic interest characteristic; and
   the at least one discretionary characteristic for the intended market for the advertisement included in the advertisement profile identifies at least some subset of a demographic characteristic, a probabilistic product preference characteristic, and probabilistic interest characteristic.

36. The computer program of claim 34, wherein
   the discretionary characteristics included in the consumer profile are generated based on transactions in a first field; and
   the advertisement associated with the advertisement profile is for a second field.

37. The computer program of claim 36, wherein the first field and the second field differ based on at least some subset of product, service, or industry.

38. The computer program of claim 34, wherein the discretionary characteristics are used to target advertisements to the consumer that typically would not be directly linked with the transactions.

39. The computer program of claim 34, further comprising means for selecting targeted advertisements based on said correlating.

40. The computer program of claim 39, further comprising means for presenting the targeted advertisements to the consumer.

41. A method for identifying consumers to be targeted with an advertisement, the method comprising:
   retrieving transaction records, wherein the transaction records include an inventory of transactions recorded for a plurality of consumers and identifies which of the recorded transactions are associated with which of the plurality of consumers;
   generating a consumer profile for at least a subset of the plurality of consumers identified in the transaction records, wherein each consumer profile is based at least in part on the recorded transactions associated with the consumer and heuristic rules associated with at least some subset of the recorded transactions associated with the consumer, wherein the heuristic rules define a probabilistic measure of at least one discretionary characteristic of the consumer not directly represented in the transaction records and the consumer profile identifies at least one probabilistic discretionary characteristic of the consumer that is not directly represented in the transaction records;
   retrieving an advertisement profile associated with the advertisement, wherein the advertisement profile identifies at least one discretionary characteristic of an intended market for the advertisement; and
   identifying a set of consumers to receive the advertisement by correlating the advertisement profile with at least a subset of the consumer profiles.

42. The method of claim 41, wherein said identifying includes determining those consumers having at least one discretionary characteristic matching at least one discretionary characteristic of the intended market for the advertisement.

43. The method of claim 41, wherein said identifying includes determining those consumers having similarities between the at least one probabilistic discretionary characteristic of the consumer and the at least one discretionary characteristic for the intended market for the advertisement.

44. The method of claim 41, wherein
   the heuristic rules define a probabilistic measure of at least some subset of a demographic characteristic, a product preference characteristic, and an interest characteristic of the consumer not directly represented in the transaction records;
   the consumer profile identifies at least some subset of a probabilistic demographic characteristic, a probabilistic product preference characteristic, and a probabilistic interest characteristic of the consumer that is not directly represented in the transaction records; and
   the advertisement profile identifies at least some subset of a demographic characteristic, a product preference characteristic, and an interest characteristic of an intended market for the advertisement.

45. The method of claim 41, wherein
   the discretionary characteristics included in the consumer profile are generated based on transactions in a first field; and the advertisement associated with the advertisement profile is for a second field.

46. The method of claim 45, wherein the first field and the second field differ based on at least some subset of product, service, or industry.

47. The method of claim 41, wherein the discretionary characteristics are used to target advertisements to the consumer that typically would not be directly linked with the transactions.

48. The method of claim 41, wherein the consumer profile further includes at least some subset of deterministic information about the consumer and transaction related traits.

49. The method of claim 41, wherein the transactions include at least some subset of consumer purchases, consumer television interactions, and consumer Internet usage.

50. The method of claim 48, wherein the transaction related traits include at least some subset of purchasing habits, television viewing habits, and Internet usage habits.

51. The method of claim 41, further comprising presenting the targeted advertisements to the set of consumers.

52. The method of claim 51, wherein said presenting includes presenting the advertisement to the set of consumers via at least some subset of a television, internet, mail, point-of-sale checkout, and kiosk.

53. The method of claim 41, wherein the targeted advertisements are at least some subset of television commercial, Internet advertisement, in store advertisement and coupon.

54. A system for identifying consumers to be targeted with an advertisement, the system comprising:
- means for retrieving transaction records, wherein the transaction records include an inventory of transactions recorded for a plurality of consumers and identifies which of the recorded transactions are associated with which of the plurality of consumers;
- means for generating a consumer profile for at least a subset of the plurality of consumers identified in the transaction records, wherein each consumer profile is based at least in part on the recorded transactions associated with the consumer and heuristic rules associated with at least some subset of the recorded transactions associated with the consumer, wherein the heuristic rules define a probabilistic measure of at least one discretionary characteristic of the consumer not directly represented in the transaction records and the consumer profile identifies at least one probabilistic discretionary characteristic of the consumer that is not directly represented in the transaction records;
- means for retrieving an advertisement profile associated with the advertisement, wherein the advertisement profile identifies at least one discretionary characteristic of an intended market forte advertisement; and
- means for identifying a set of consumers to receive the advertisement by correlating the advertisement profile with at least a subset of the consumer profiles.

55. The system of claim 54, wherein said means for identifying determines those consumers having at least one discretionary characteristic matching at least one discretionary characteristic of the intended market for the advertisement.

56. The system of claim 54, wherein said means for identifying determines those consumers having similarities between the at least one probabilistic discretionary characteristic of the consumer and the at least one discretionary characteristic for the intended market for the advertisement.

57. The system of claim 54, wherein
the heuristic rules define a probabilistic measure of at least some subset of a demographic characteristic, a product preference characteristic, and an interest characteristic of the consumer not directly represented in the transaction records;
the consumer profile identifies at least some subset of a probabilistic demographic characteristic, a probabilistic product preference characteristic, and a probabilistic interest characteristic of the consumer that is not directly represented in the transaction records; and
the advertisement profile identifies at least some subset of a demographic characteristic, a product preference characteristic, and an interest characteristic of an intended market for the advertisement.

58. The system of claim 54, wherein
the discretionary characteristics included in the consumer profile are generated based on transactions in a first field; and
the advertisement associated with the advertisement profile is for a second field.

59. The system of claim 58, wherein the first field and the second field differ based on at least some subset of product, service, or industry.

60. The system of claim 54, wherein the discretionary characteristics are used to target advertisements to the consumer that typically would not be directly linked with the transactions.

61. The system of claim 54, further comprising means for presenting the targeted advertisements to the set of consumers.

62. The system of claim 61, wherein said means for presenting includes at least some subset of a television, Internet, mail, point-of-sale checkout, and kiosk.

63. The system of claim 54, wherein the targeted advertisements are at least some subset of television commercial, Internet advertisement, in store advertisement and coupon.

64. A computer program embodied on a computer readable medium for identifying consumers to be targeted with an advertisement the computer program comprising:
- a source code segment for retrieving transaction records, wherein the transaction records include an inventory of transactions recorded for a plurality of consumers and identifies which of the recorded transactions are associated with which of the plurality of consumers;
- a source code segment for generating a consumer profile for at least a subset of the plurality of consumers identified in the transaction records, wherein each consumer profile is based at least in part on the recorded transactions associated with the consumer and heuristic rules associated with at least some subset of the recorded transactions associated with the consumer, wherein the heuristic rules define a probabilistic measure of at least one discretionary characteristic of the consumer not directly represented in the transaction records and the consumer profile identifies at least one probabilistic discretionary characteristic of the consumer that is not directly represented in the transaction records;
- a source code segment for retrieving an advertisement profile associated with the advertisement, wherein the advertisement profile identifies at least one discretionary characteristic of an intended market for the advertisement; and
- a source code segment for identifying a set of consumers to receive the advertisement by correlating the advertisement profile with at least a subset of the consumer profiles.

65. The computer program of claim 64, wherein said source code segment for identifying determines those consumers having at least one discretionary characteristic matching at least one discretionary characteristic of the intended market for the advertisement.

66. The computer program of claim 64, wherein said source code segment for identifying determines those consumers having similarities between the at least one probabilistic discretionary characteristic of the consumer and the at least one discretionary characteristic for the intended market for the advertisement.

67. The computer program of claim 64, wherein
- the heuristic rules define a probabilistic measure of at least some subset of a demographic characteristic, a product preference characteristic, and an interest characteristic of the consumer not directly represented in the transaction records;
- the consumer profile identifies at least some subset of a probabilistic demographic characteristic, a probabilistic product preference characteristic, and a probabilistic interest characteristic of the consumer that is not directly represented in the transaction records; and
- the advertisement profile identifies at least some subset of a demographic characteristic, a product preference characteristic, and an interest characteristic of an intended market for the advertisement.

68. The computer program of claim 64, wherein
- the discretionary characteristics included in the consumer profile are generated based on transactions in a first field; and
- the advertisement associated with the advertisement profile is for a second field.

69. The computer program of claim 68, wherein the first field and the second field differ based on at least some subset of product, service, or industry.

70. The computer program of claim 64, wherein the discretionary characteristics are used to target advertisements to the consumer that typically would not be directly linked with the transactions.

71. The computer program of claim 64, further comprising a source code segment for presenting the targeted advertisements to the set of consumers.

72. The computer program of claim 64, wherein the targeted advertisements are at least some subset of television commercial, Internet advertisement, in store advertisement and coupon.

* * * * *

UNITED STATES PATENT AND TRADEMARK OFFICE
CERTIFICATE OF CORRECTION

PATENT NO.   : 6,560,578 B2
DATED        : May 6, 2003
INVENTOR(S)  : Charles A. Eldering It is certified that error appears in the above-identified patent and that said Letters Patent is hereby corrected as shown below:

Column 14,
Line 65, delete "to" and replace with -- the --;

Column 15,
Line 10, delete "to" and replace with -- the --;
Line 32, delete "ax" and replace with -- at --;

Column 17,
Line 9, delete "sane" and replace with -- some --;

Column 19,
Line 22, delete "internet" and replace with -- Internet --;
Line 51, delete "forte" and replace with -- for the --.

Signed and Sealed this

Sixteenth Day of December, 2003

JAMES E. ROGAN
*Director of the United States Patent and Trademark Office*

UNITED STATES PATENT AND TRADEMARK OFFICE
CERTIFICATE OF CORRECTION

| | | |
|---|---|---|
| PATENT NO. | : 6,560,578 B2 | Page 1 of 4 |
| APPLICATION NO. | : 09/774473 | |
| DATED | : May 6, 2003 | |
| INVENTOR(S) | : Charles A. Eldering | |

It is certified that error appears in the above-identified patent and that said Letters Patent is hereby corrected as shown below:

The title page showing the illustrative figure should be deleted to be replaced with the attached title page.

Drawing sheet, consisting of fig. 5 should be deleted to be replaced with the drawing sheet, consisting of fig. 5, as shown on the attached page.

In the drawings, Sheet 10, Fig. 5, the reference numeral 572 should be applied to the ad price line labeled 570 which is attached to Pricing Policy 570 and Consumer Profiling System 500;

In the drawings, Sheet 11, Fig. 6A, line 9, delete "HOUSEHOLD DEMOGRAPHICS VECTOR" and replace with --DEMOGRAPHIC CHARACTERIZATION VECTOR--;

Column 5, line 30, delete "sever" and replace with --server--;

Column 5, line 30, delete "160" and replace with --162--;

Column 10, line 58, delete "advertisements" and replace with --advertisement--;

Column 10, line 59, delete "advertisements" and replace with --advertisement--;

Column 13, line 52, delete "6b" and replace with --6B--;

Column 16, line 32, delete "ax" and replace with --at--;

Column 17, line 19, delete "sane" and replace with --some--;

Signed and Sealed this

Sixth Day of November, 2007

JON W. DUDAS
*Director of the United States Patent and Trademark Office*

(12) United States Patent
Eldering

(10) Patent No.: US 6,560,578 B2
(45) Date of Patent: May 6, 2003

(54) ADVERTISEMENT SELECTION SYSTEM SUPPORTING DISCRETIONARY TARGET MARKET CHARACTERISTICS

(75) Inventor: Charles A. Eldering, Doylestown, PA (US)

(73) Assignee: Expanse Networks, Inc., Doylestown, PA (US)

(*) Notice: Subject to any disclaimer, the term of this patent is extended or adjusted under 35 U.S.C. 154(b) by 95 days.

(21) Appl. No.: 09/774,473

(22) Filed: Jan. 31, 2001

(65) Prior Publication Data
US 2001/0004733 A1 Jun. 21, 2001

Related U.S. Application Data

(63) Continuation of application No. 09/258,526, filed on Mar. 12, 1999, now Pat. No. 6,216,129.

(51) Int. Cl.[7] ............................................. G06F 17/60
(52) U.S. Cl. ............................................. 705/14
(58) Field of Search ............................... 705/1, 10, 14, 705/26; 707/10, 104.1

(56) References Cited

U.S. PATENT DOCUMENTS

| | | | |
|---|---|---|---|
| 4,833,308 A | 5/1989 | Humble | 235/383 |
| 4,930,011 A | 5/1990 | Kiewit | 358/84 |
| 4,972,504 A | 11/1990 | Daniel, Jr. et al. | 455/2 |
| 5,099,319 A | 3/1992 | Esch et al. | 358/86 |
| 5,128,752 A * | 7/1992 | Von Kohorn | 358/84 |
| 5,155,591 A | 10/1992 | Wachob | 358/86 |
| 5,201,010 A | 4/1993 | Deaton et al. | 382/7 |
| 5,227,508 A | 7/1993 | Kozikowski et al. | 382/7 |
| 5,231,494 A | 7/1993 | Wachob | 358/146 |
| 5,237,620 A | 8/1993 | Deaton et al. | 382/7 |

(List continued on next page.)

FOREIGN PATENT DOCUMENTS

| | | |
|---|---|---|
| WO | 9423383 | 10/1994 |
| WO | 9717774 | 5/1997 |
| WO | 9726612 | 7/1997 |
| WO | 9741673 | 11/1997 |
| WO | 9821877 | 5/1998 |
| WO | 9828906 | 7/1998 |
| WO | 9834189 | 8/1998 |
| WO | 9901984 | 1/1999 |
| WO | 9904561 | 1/1999 |
| WO | 9965237 | 12/1999 |
| WO | 9966719 | 12/1999 |
| WO | 0008802 | 2/2000 |
| WO | 0014951 | 3/2000 |
| WO | 0033224 | 6/2000 |
| WO | 0054504 | 9/2000 |

OTHER PUBLICATIONS

Fortanet et al., Netvertising: content-based subgeneric variations in a digital genre, IEEE, System Sciences Proceedings of the Thirty-First Hawaii International Conference, vol. 2, pp. 87-96, Jan. 1998.*
2001/0004733 Eldering Jun. 21, 2001.*

Primary Examiner—Stephen Gravini
(74) Attorney, Agent, or Firm—Douglas J. Ryder

(57) ABSTRACT

An advertisement selection system is presented in which vectors describing an actual or hypothetical market for a product or desired viewing audience can be determined. An ad characterization vector is transmitted along with a consumer ID. The consumer ID is used to retrieve a consumer characterization vector which is correlated with the ad characterization vector to determine the suitability of the advertisement to the consumer. The consumer characterization vector describes statistical information regarding the demographics and product purchase preferences of a consumer, and is developed from previous purchases or viewing habits. A price for displaying the advertisement can be determined based on the results of the correlation of the ad characterization vector with the consumer characterization vector.

72 Claims, 17 Drawing Sheets

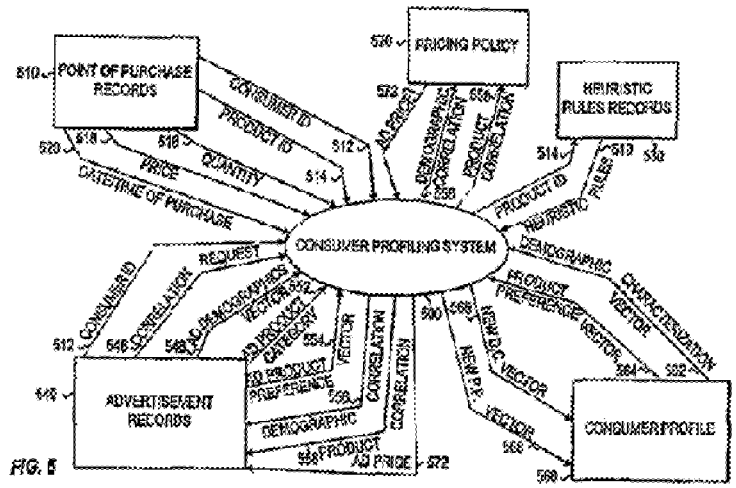

FIG. 5

```
READ POP DATA
FOR N=1 TO M
    READ PRODUCT ID
    RETRIEVE [PRODUCT DEMOGRAPHICS VECTOR]
    RETRIEVE [DEMOGRAPHIC CHARACTERIZATION VECTOR]
    RETRIEVE [PRODUCT PREFERENCE VECTOR]
    WEIGHT = PRODUCT TOTAL PURCHASE/PRODUCT CATEGORY
            TOTAL PURCHASE
    DEMOGRAPHIC CHARACTERIZATION VECTOR =
            (WEIGHT) * (PRODUCT DEMOGRAPHICS VECTOR) +
            (DEMOGRAPHIC CHARACTERIZATION VECTOR)
    NORMALIZE [DEMOGRAPHIC CHARACTERIZATION VECTOR]
    STORE [DEMOGRAPHIC CHARACTERIZATION VECTOR]
    PRODUCT PREFERENCE VECTOR =
            (WEIGHT * PRODUCT PURCHASE VECTOR) + (PRODUCT
            PREFERENCE VECTOR)
    NORMALIZE [PRODUCT PREFERENCE VECTOR]
    STORE [PRODUCT PREFERENCE VECTOR]
NEXT M
```

FIG. 6A